United States Patent
Ueda

(10) Patent No.: US 9,787,144 B2
(45) Date of Patent: Oct. 10, 2017

(54) ROTATING ELECTRICAL MOTOR USING TRANSVERSE MAGNETIC FLUX

(71) Applicant: Kabushiki Kaisha Toshiba, Tokyo (JP)

(72) Inventor: Yasuhito Ueda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 483 days.

(21) Appl. No.: 14/328,135

(22) Filed: Jul. 10, 2014

(65) Prior Publication Data
US 2015/0015126 A1     Jan. 15, 2015

(30) Foreign Application Priority Data
Jul. 10, 2013 (JP) ................................ 2013-144729

(51) Int. Cl.
| | |
|---|---|
| *H02K 21/12* | (2006.01) |
| *H02K 21/38* | (2006.01) |
| *H02K 11/00* | (2016.01) |
| *H02K 1/14* | (2006.01) |
| *H02K 1/24* | (2006.01) |
| *H02K 19/10* | (2006.01) |
| *H02K 11/21* | (2016.01) |

(52) U.S. Cl.
CPC ............ *H02K 1/145* (2013.01); *H02K 1/243* (2013.01); *H02K 11/21* (2016.01); *H02K 19/10* (2013.01); *H02K 2201/12* (2013.01)

(58) Field of Classification Search
CPC ................................... H02K 1/12; H02K 1/06
USPC ............ 310/154.27, 154.33, 154.42, 156.02, 310/156.06, 199
See application file for complete search history.

(56) References Cited

U.S. PATENT DOCUMENTS 5,543,674 A * 8/1996 Koehler ............... H02K 19/103
310/164
6,144,138 A   11/2000 Ragaly
(Continued)

FOREIGN PATENT DOCUMENTS

| CN | 101114778 A | 1/2008 |
| CN | 101197508 A | 6/2008 |

(Continued)

OTHER PUBLICATIONS

First Office Action from the State Intellectual Property Office of China for counterpart Chinese Application No. 2014103268676 dated Apr. 6, 2016.

*Primary Examiner* — Jose Gonzalez Quinones
(74) *Attorney, Agent, or Firm* — Finnegan, Henderson, Farabow, Garrett & Dunner, L.L.P.

(57) ABSTRACT

According to an embodiment, a rotating electrical machine includes a rotor and a stator. The rotor includes a first coil, first magnetic poles and second magnetic poles. The stator includes a second coil, third magnetic poles and fourth magnetic poles. One of a first magnetic pole and a second magnetic pole opposite to the first magnetic pole is formed such that a leading end of the one of the first magnetic pole and the second magnetic pole lies opposite a central portion of an opposite surface of the stator. One of a third magnetic pole and a fourth magnetic pole opposite to the third magnetic pole is formed such that a leading end of the one of the third magnetic pole and the fourth magnetic pole lies opposite a central portion of an opposite surface of the rotor.

2 Claims, 27 Drawing Sheets

(56) References Cited

U.S. PATENT DOCUMENTS

| | | |
|---|---|---|
| 6,236,131 B1 | 5/2001 | Schafer |
| 6,657,329 B2 * | 12/2003 | Kastinger ............ H02K 21/145 |
| | | 310/254.1 |
| 2004/0021374 A1 | 2/2004 | Kang et al. |
| 2005/0062352 A1 | 3/2005 | Kastinger |
| 2006/0055280 A1 | 3/2006 | Isoda et al. |
| 2008/0018196 A1 | 1/2008 | Enomoto et al. |
| 2008/0136272 A1 | 6/2008 | Ishikawa et al. |
| 2008/0315702 A1 * | 12/2008 | Ishikawa ................ H02K 1/145 |
| | | 310/159 |
| 2012/0249035 A1 | 10/2012 | Ueda |

FOREIGN PATENT DOCUMENTS

| | | |
|---|---|---|
| CN | 102545519 A | 7/2012 |
| CN | 102738990 A | 10/2012 |
| JP | 3645663 | 5/2005 |
| JP | 3910938 | 4/2007 |
| JP | 4085059 | 4/2008 |
| JP | 4140783 | 8/2008 |
| JP | 4709846 | 6/2011 |

* cited by examiner

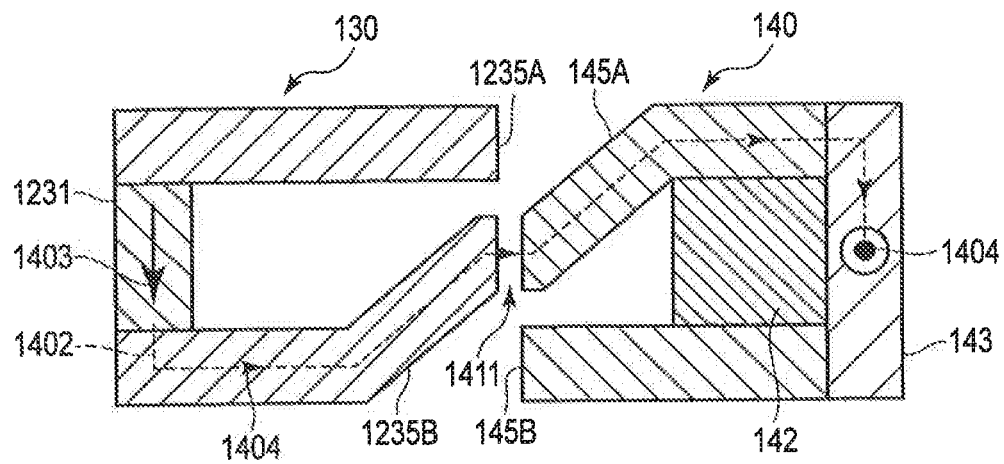
F I G. 14A
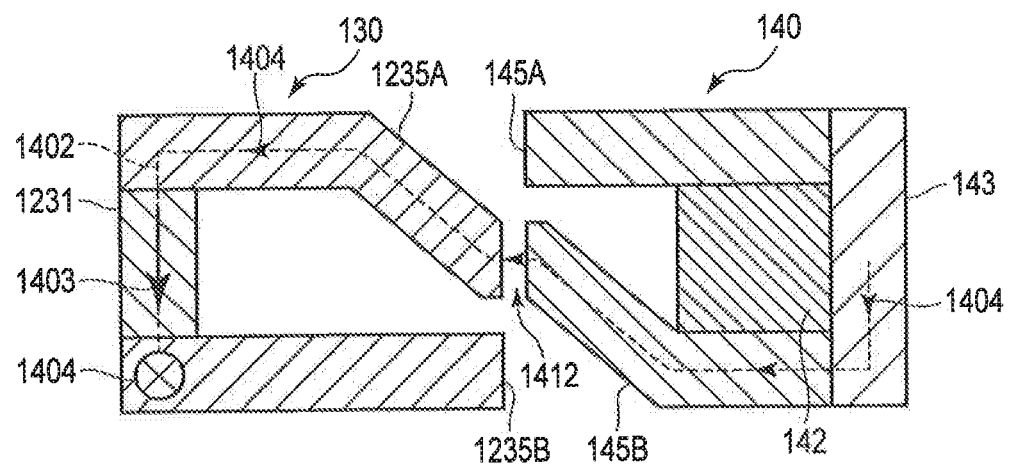
F I G. 14B

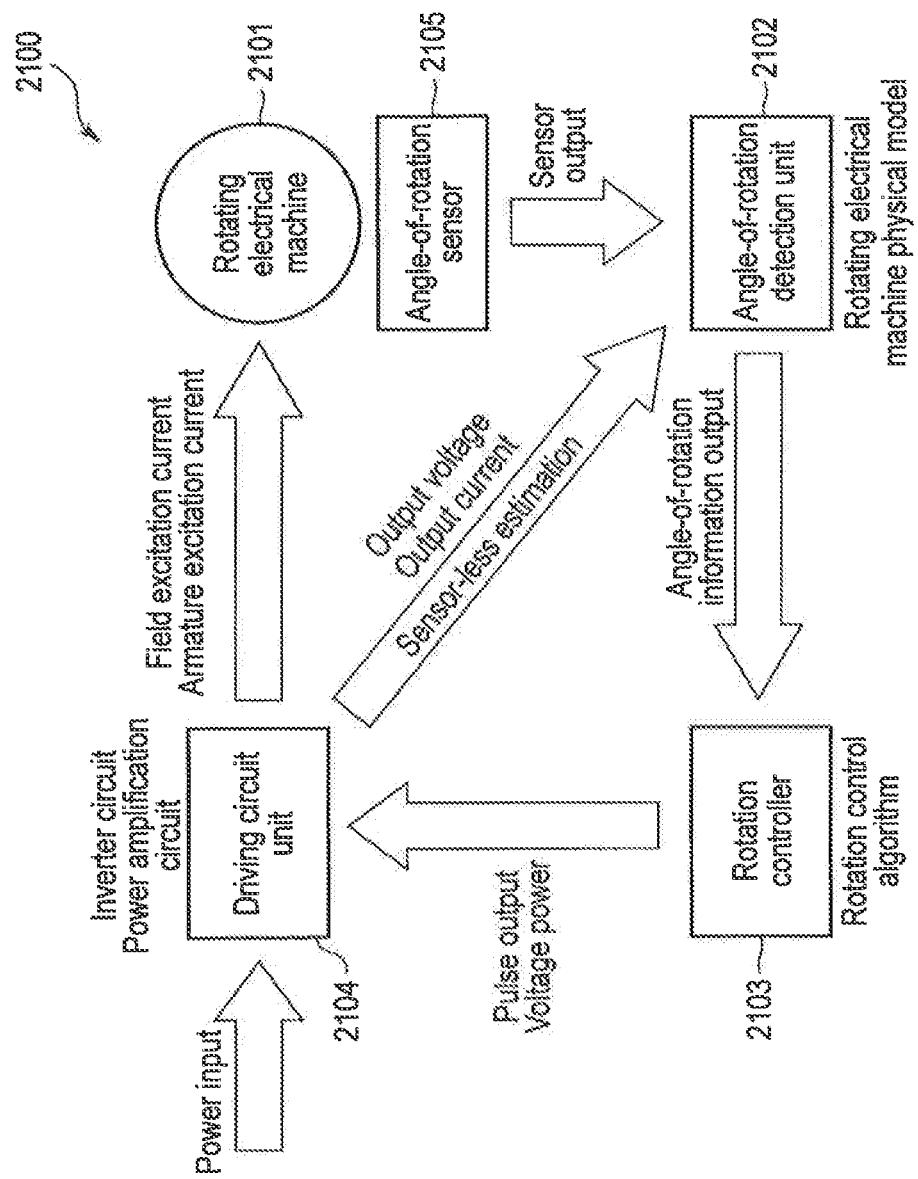
F I G. 21

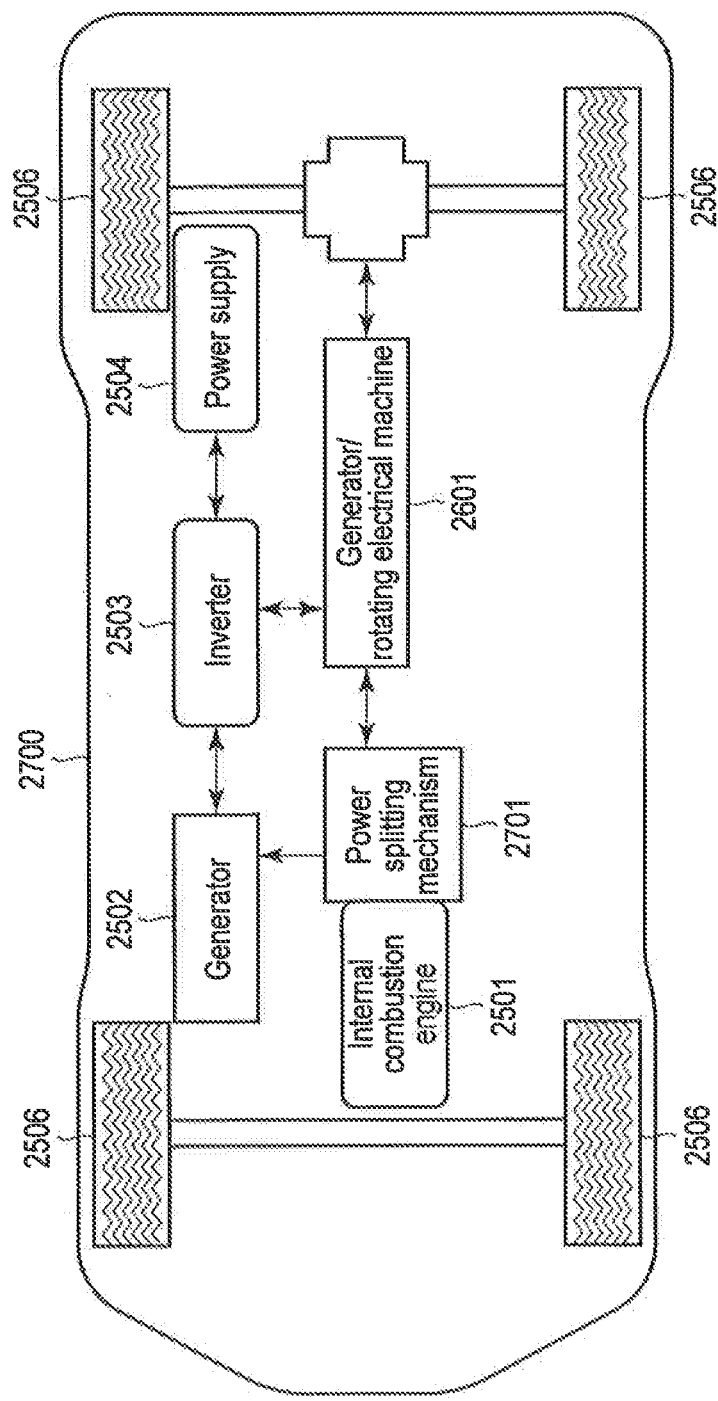
F I G. 27

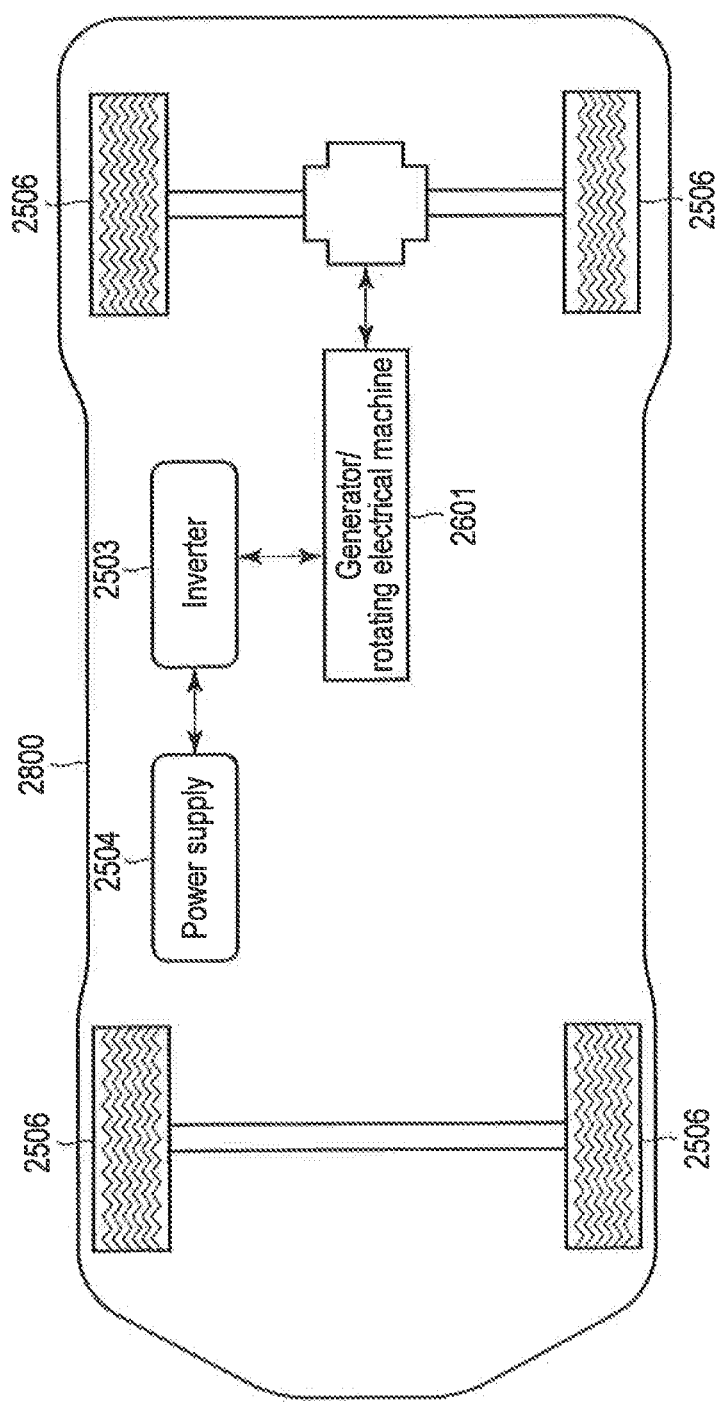
F I G. 28

ROTATING ELECTRICAL MOTOR USING TRANSVERSE MAGNETIC FLUX

CROSS-REFERENCE TO RELATED APPLICATIONS

This application is based upon and claims the benefit of priority from Japanese Patent Application No. 2013-144729, filed Jul. 10, 2013, the entire contents of which are incorporated herein by reference.

FIELD

Embodiments described herein relate generally to a transverse magnetic flux rotating electrical machine and a vehicle using the transverse magnetic flux rotating electrical machine.

BACKGROUND

A conventional transverse magnetic flux rotating electrical machine includes a stator and a rotor. The stator is formed using an annular coil wound coaxially around the rotor and U-shaped iron cores circumferentially provided around the annular coil. The rotor is formed using permanent magnets and iron cores arranged opposite magnetic poles of the stator. This structure is well known.

The conventional transverse magnetic flux rotating electrical machine may include combinations of stators and rotors having different relative relations in a direction of rotation. A torque is generated by supplying polyphase AC power to the annular coils of the stators. This structure generally allows a multi-pole magnetic field to be easily generated, resulting in a high torque.

However, the conventional transverse magnetic flux rotating electrical machine is structured such that the presence of air gaps between the adjacent U-shaped iron cores is likely cause leakage of the magnetic field. For an increased torque, such leakage of a magnetic field needs to be reduced.

BRIEF DESCRIPTION OF THE DRAWINGS

FIG. 14A and FIG. 14B are partial cross-sectional views of the rotating electrical machine in FIG. 11;

FIG. 21 is a block diagram schematically showing a rotating electrical machine driving system according to a fifth embodiment;

FIG. 27 is a block diagram schematically showing yet another example of the vehicle according to the sixth embodiment; and FIG. 28 is a block diagram schematically showing still another example of the vehicle according to the sixth embodiment.

DETAILED DESCRIPTION

In general, according to an embodiment, a transverse magnetic flux rotating electrical machine includes a rotor and a stator. The rotor is rotatable about a rotating shaft and includes a first coil wound in a direction of rotation and a first ferromagnetic substance provided around the first coil. The stator is provided opposite the rotor and includes a second coil wound in the direction of rotation and a second ferromagnetic substance provided around the second coil. The first ferromagnetic substance includes a first annular portion, a plurality of first magnetic poles extending from an end of the first annular portion toward the stator, and a plurality of second magnetic poles extending from another end of the first annular portion toward the stator. One of a first magnetic pole and a second magnetic pole opposite to the first magnetic pole is formed such that a leading end of the one of the first magnetic pole and the second magnetic pole lies opposite a central portion of an opposite surface of the stator which faces an opposite surface of the rotor. The second ferromagnetic substance includes a second annular portion, a plurality of third magnetic poles extending from an end of the second annular portion toward the rotor, and a plurality of fourth magnetic poles extending from another end of the second annular portion toward the rotor. One of a third magnetic pole and a fourth magnetic pole opposite to the third magnetic pole is formed such that a leading end of the one of the third magnetic pole and the fourth magnetic pole lies opposite a central portion of the opposite surface of the rotor.

Embodiments will be described hereinafter with reference to the accompanying drawings. In the embodiments, like reference numbers denote like elements, and a repetitive explanation will be omitted.

First Embodiment

Figure 1:
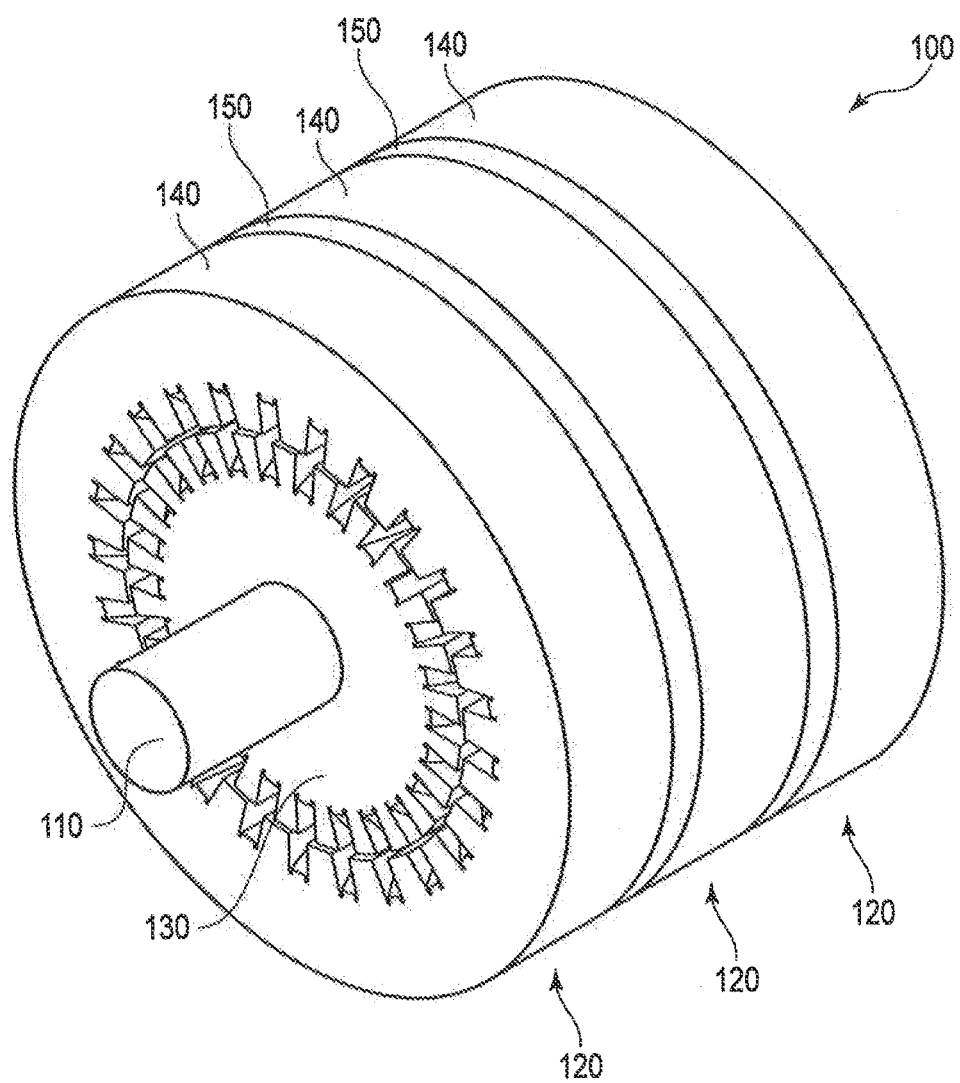
FIG. 1 is a perspective view schematically showing a rotating electrical machine according to a first embodiment.

FIG. 1 is a perspective view schematically showing a transverse magnetic flux rotating electrical machine 100 according to a first embodiment. As shown in FIG. 1, the rotating electrical machine 100 includes a rotating shaft 110 and a plurality of (in FIG. 1, three) driving elements 120 rotationally driving the rotating shaft 110. The driving elements 120 are arranged in an axial direction in which the rotating shaft 110 extends. Each of the driving elements 120 includes a rotor 130 and a stator 140. The rotating electrical machine 100 further includes a cylindrical housing (not shown) in which the driving elements 120 are housed. The rotating shaft 110 is rotatably supported by a pair of bearings provided in the housing.

Figure 2:
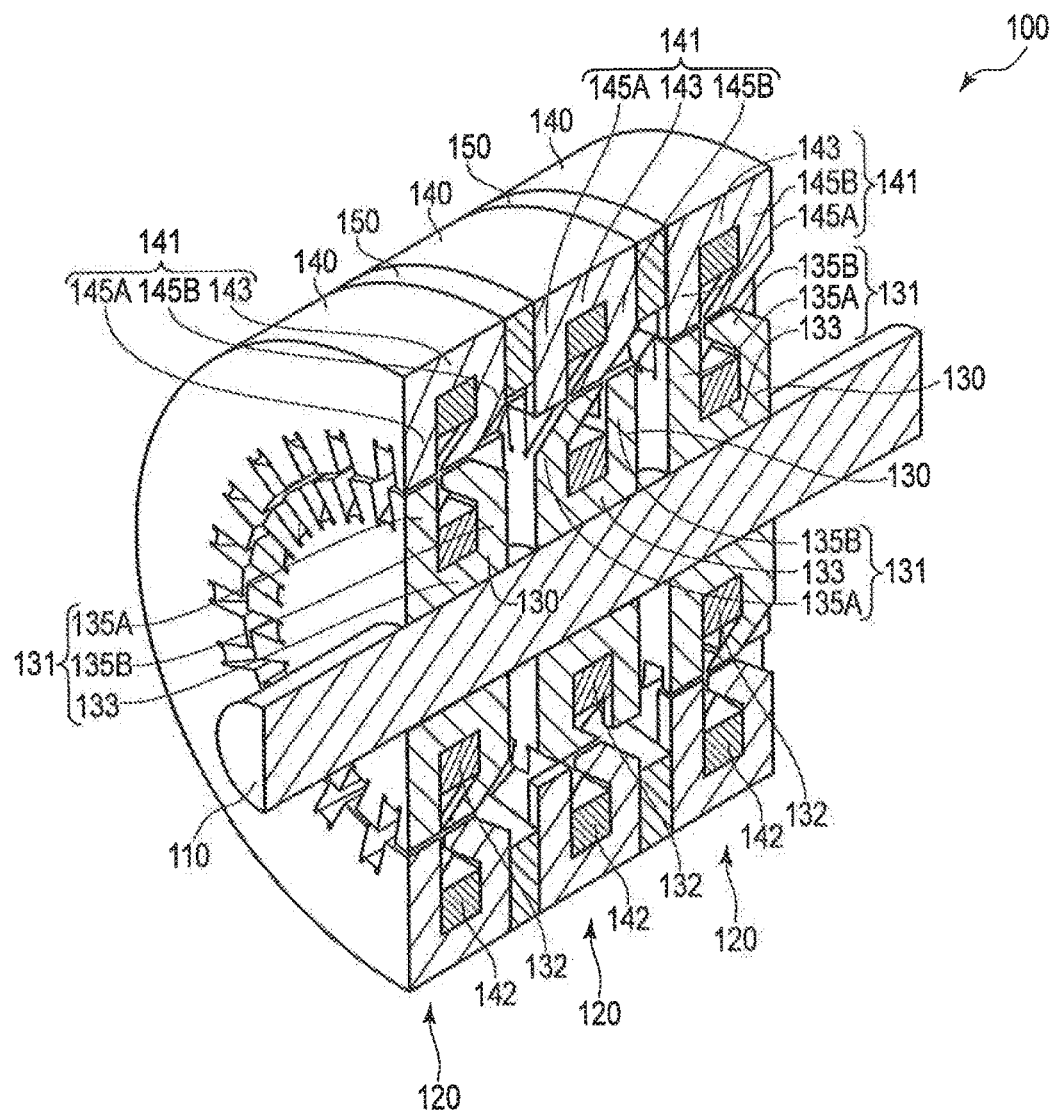
FIG. 2 is a cross-sectional perspective view showing a general structure of a rotor and a stator both shown in FIG. 1.

FIG. 2 is a cross-sectional perspective view showing a general structure of the rotor 130 and the stator 140. FIG. 2 shows a cross section of the rotating electrical machine 100 taken along an imaginary plane passing through and parallel to the rotating shaft 110. The cross section as used herein refers to a cross section taken along an imaginary plane passing through and parallel to the rotating shaft 110, that is, a cross section taken along a direction perpendicular to a direction of rotation of the rotor 130. As shown in FIG. 2, the rotors 130 are mounted on the rotating shaft 110 and joined together via the rotating shaft 110. The rotors 130 are rotatable about the rotating shaft 110. Nonmagnetic coupling members 150 are each provided between the stators 140. The stators 140 are joined together via the coupling members 150. The stators 140 are fixed to the housing. In each of the driving elements 120, the rotor 130 and the stator 140 provided opposite each other via an air gap in a radial direction perpendicular to the axial direction. In the first embodiment, the rotor 130 is positioned inside the stator 140.

The rotor 130 includes a coil (also referred to as a field coil or an armature coil) 132 wound in the direction of rotation and a ferromagnetic substance 131 provided around the coil 132. The ferromagnetic substance 131 includes an annular portion 133 coupled to the rotating shaft 110, a plurality of magnetic poles 135A extending from an end of the annular portion 133 toward the stator 140, and a plurality of magnetic poles 135B extending from another end of the annular portion 133 toward the stator 140. The plurality of magnetic poles 135A lie opposite the plurality of magnetic poles 135B, respectively, via the coil 132 in the axial direction. The rotating electrical machine 100 according to the first embodiment includes a slip ring (not shown) that can maintain an electric contact during rotation in order to supply power to the coil 132 fixed to the rotor 130.

Each of the magnetic poles 135A is paired with the axially opposite magnetic pole 135B. One of the paired magnetic poles 135A and 135B extends linearly in the radial direction. The other magnetic pole is bent such that a leading end of the magnetic pole lies opposite a central portion of an inner peripheral surface of the stator 140 which faces an outer peripheral surface of the rotor 130, i.e., such that the leading end of the magnetic pole lies opposite a central portion of an intermediate plane between the rotor 130 and the stator 140. The intermediate plane is a virtual circumferential plane which faces the rotor 130 and the stator 140. Specifically, the bent magnetic pole includes a first portion extending linearly from the annular portion 133 in the radial direction and a second portion extending linearly from a leading end of the first portion toward the central portion of the inner peripheral surface of stator 140. The bent magnetic pole is not limited to an example in which the magnetic pole is folded at a predetermined angle as shown in FIG. 2. The bent magnetic pole may be formed to have another shape, for example, a smoothly curved shape.

Figure 3:
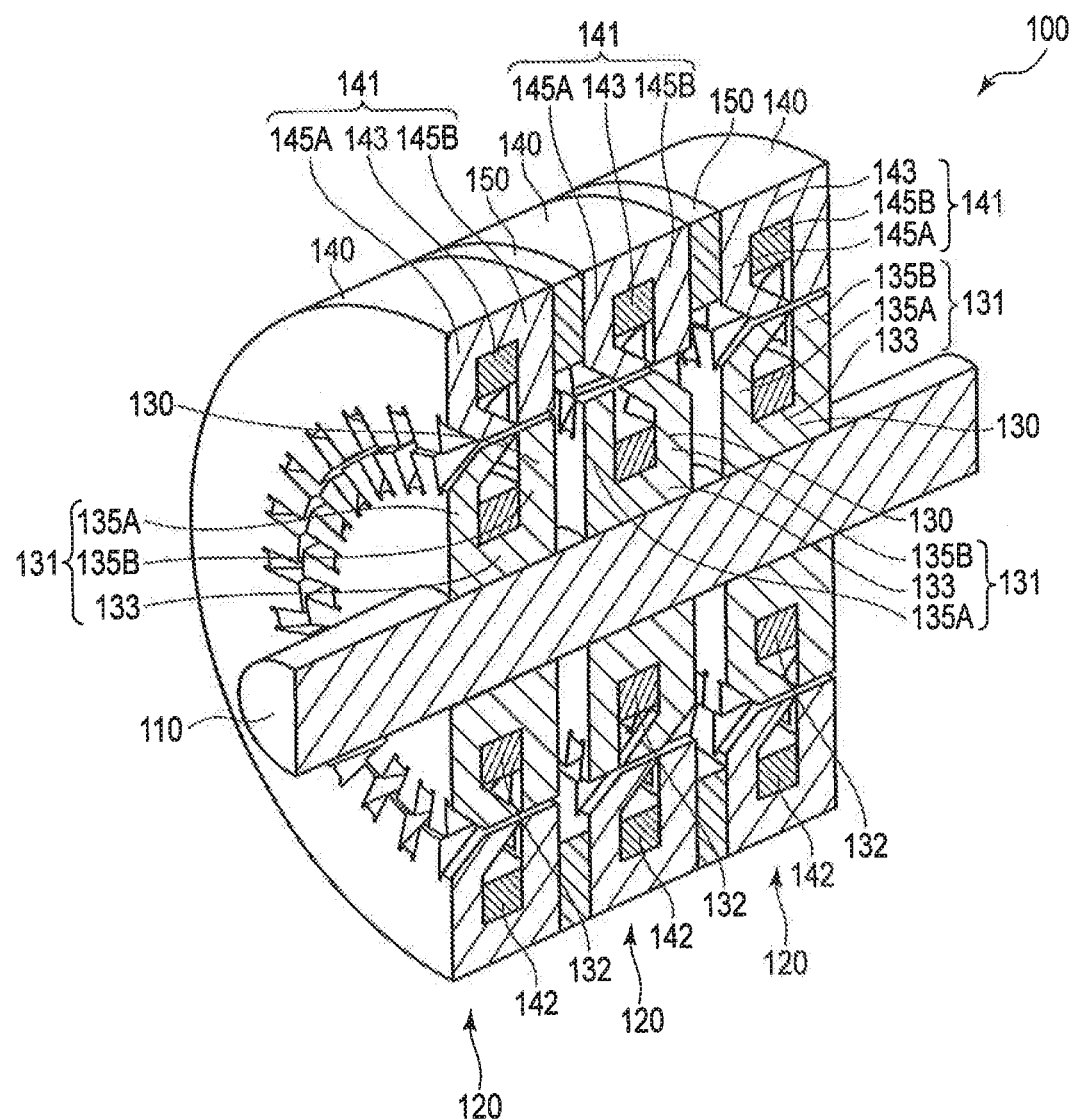
FIG. 3 is a cross-sectional perspective view showing a general structure of the rotor and the stator both shown in FIG. 1, in a cross section different from the cross section in FIG. 2 by a pole pitch.

In the rotor 130, the linear magnetic poles and the bent magnetic poles are alternately arranged in a circumferential direction. That is, a first magnetic pole shape pattern and a second magnetic pole shape pattern are alternately repeated in the circumferential direction; in the first magnetic pole shape pattern, the magnetic poles 135A are linear magnetic poles, and the magnetic poles 135B are bent magnetic poles, and in the second magnetic pole shape pattern, the magnetic poles 135A are bent magnetic poles, and the magnetic poles 135B are linear magnetic poles. FIG. 3 shows a cross section inclined at an angle corresponding to a pole pitch to the cross section shown in FIG. 2. As shown in FIG. 2 and FIG. 3, when the ferromagnetic substance 131 shows the first magnetic pole shape pattern in a certain cross section, the ferromagnetic substance 131 shows the second magnetic pole shape pattern in a cross section different, by the pole pitch, from the cross section corresponding to the first magnetic pole shape pattern. Furthermore, when the ferromagnetic substance 131 shows the second magnetic pole shape pattern in a certain cross section, the ferromagnetic substance 131 shows the first magnetic pole shape pattern in a cross section different, by the pole pitch, from the cross section corresponding to the second magnetic pole shape pattern.

On the other hand, the stator 140 includes a coil (also referred to as a field coil or an armature coil) 142 wound in the direction of rotation and a ferromagnetic substance 141 provided around the coil 142. The ferromagnetic substance 141 includes an annular portion 143, a plurality of magnetic poles 145A extending from an end of the annular portion 143 toward the rotor 140, and a plurality of magnetic poles 145B extending from another end of the annular portion 143 toward the rotor 130. The plurality of magnetic poles 145A lies opposite the plurality of magnetic poles 145B, respectively, via the coil 132 in the axial direction.

Each of the magnetic poles 145A is paired with the axially opposite magnetic pole 145B. One of the paired magnetic poles 145A and 145B extends linearly in the radial direction. The other magnetic pole is bent such that a leading end of the magnetic pole lies opposite a central portion of the outer peripheral surface of the rotor 130, i.e., such that the leading end of the magnetic pole lies opposite the central portion of the intermediate plane. Specifically, the bent magnetic pole includes a first portion extending linearly from the annular portion 143 in the radial direction and a second portion extending linearly from a leading end of the first portion toward the central portion of the outer peripheral surface of the rotor 130. The second portion extends toward the coil 132 of rotor 130. The bent magnetic pole is not limited to an example in which the magnetic pole is folded at a predetermined angle as shown in FIG. 2. The bent magnetic pole may be formed to have another shape, for example, a smoothly curved shape.

In the stator 140, linear magnetic poles and bent magnetic poles are alternately arranged in a circumferential direction. That is, a third magnetic pole shape pattern and a fourth magnetic pole shape pattern are alternately repeated in the circumferential direction; in the third magnetic pole shape pattern, the magnetic poles 145A are linear magnetic poles, and the magnetic poles 145B are bent magnetic poles, and in the fourth magnetic pole shape pattern, the magnetic poles 145A are bent magnetic poles, and the magnetic poles 145B are linear magnetic poles. As shown in FIG. 2 and FIG. 3, when the ferromagnetic substance 141 shows the third magnetic pole shape pattern in a certain cross section, the ferromagnetic substance 141 shows the fourth magnetic pole shape pattern in a cross section different, by a pole pitch, from the cross section corresponding to the third magnetic pole shape pattern. Furthermore, when the ferromagnetic substance 141 shows the fourth magnetic pole shape pattern in a certain cross section, the ferromagnetic substance 141 shows the third magnetic pole shape pattern in a cross section different, by the pole pitch, from the cross section corresponding to the fourth magnetic pole shape pattern.

In each of the driving elements 120, a torque is generated by supplying current to the coils 132 and 142. A mechanism for torque generation will be described below. The generated torque rotates the rotor 130 and thus the rotating shaft 110. In the first embodiment, the three driving elements 120 vary in relative phase in the direction of rotation. Thus, the torque can be controlled by adjusting the ratio of current supplied to the coil 132 in the driving element 120 to the current supplied to the coil 142 in the driving element 120.

The driving elements 120 are not limited to the example in which three driving elements are provided as shown in FIG. 2, and one, two, or four or more driving elements may be provided.

Now, the mechanism by which each of the driving elements 120 generates a torque will be described with reference to FIG. 4A and FIG. 4B and FIG. 5A and FIG. 5B.

Figure 4A:
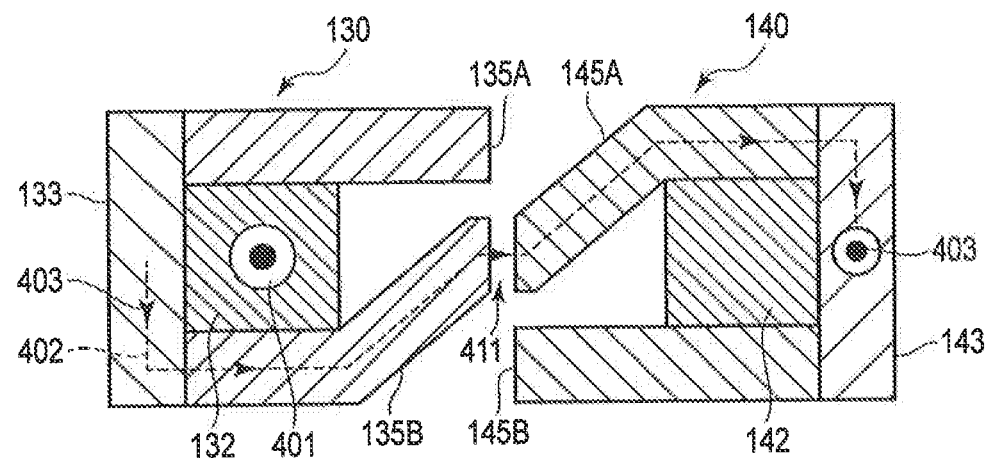
FIG. 4A and FIG. 4B are partial cross-sectional views of the rotating electrical machine in FIG. 1.
Figure 4B:
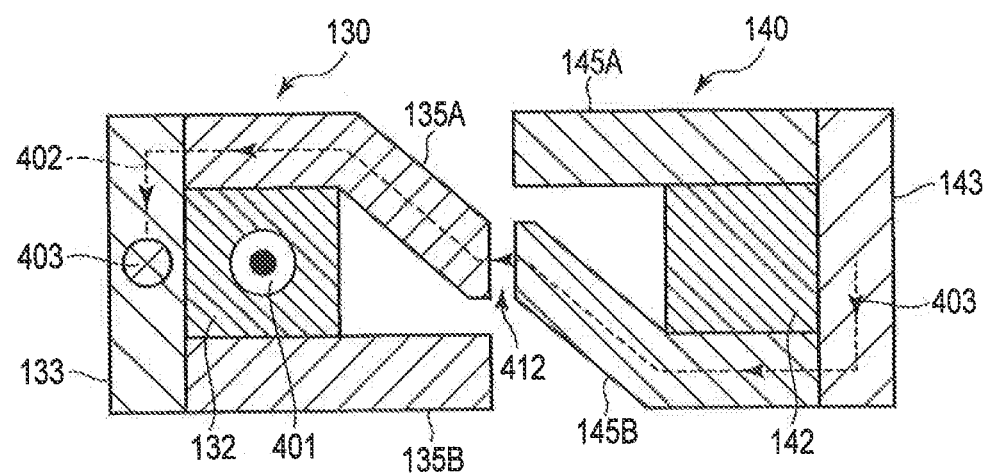
Figure 5A:
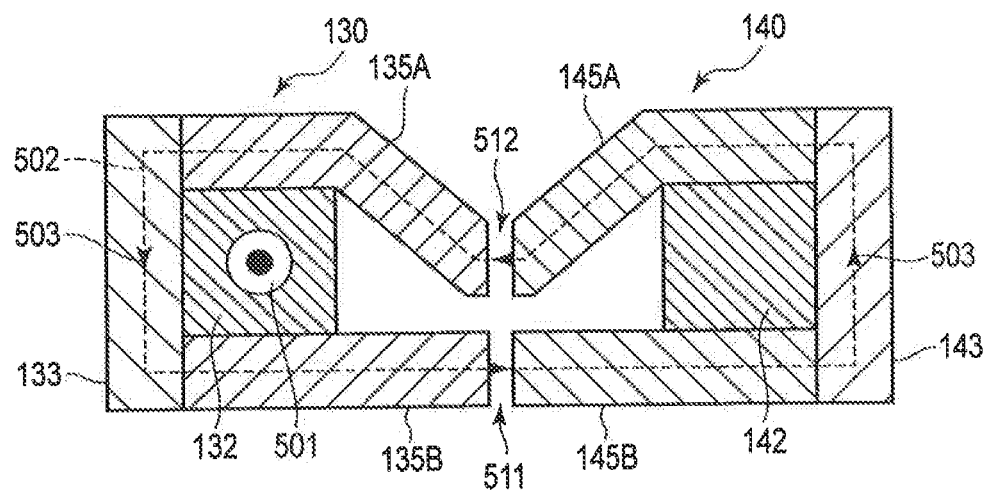
FIG. 5A and FIG. 5B are partial cross-sectional views of the rotating electrical machine in FIG. 1.

At a certain angle of rotation, a portion in which the bent magnetic pole 135B of the rotor 130 lies opposite the bent magnetic pole 145A of the stator 140 as shown in FIG. 4A is located adjacent to a portion in which the bent magnetic pole 135A of the rotor 130 lies opposite the bent magnetic pole 145B of the stator 140 as shown in FIG. 4B. At another angle of rotation, the bent magnetic pole 135A of the rotor 130 lies opposite the bent magnetic pole 145A of the stator 140, and the linear magnetic pole 135B of the rotor 130 lies opposite the linear magnetic pole 145B of the stator 140, as shown in FIG. 5A. In a portion adjacent to the portion shown in FIG. 5A, the linear magnetic pole 135A of the rotor 130 lies opposite the linear magnetic pole 145A of the stator 140, and the bent magnetic pole 135B of the rotor 130 lies opposite the bent magnetic pole 145B of the stator 140, as shown in FIG. 5B.

In the portions shown in FIG. 4A and FIG. 4B, passing a current 401 through the coil 132 in the rotor 130 forms a magnetic circuit 402, allowing a magnetic flux to flow in a direction shown by arrow 403. The magnetic flux also flows in the circumferential direction (corresponding to a direction perpendicular to the sheet of FIG. 4A and FIG. 4B) in the annular portion 133 of the rotor 130 and the annular portion 143 of the stator 140. Thus, the magnetic circuit 402 is formed across the two portions shown in FIG. 4A and FIG. 4B. The magnetic circuit 402 is formed to be interlinked with the excited coil 132. Specifically, when the coil 132 is excited, a magnetic flux flows through a path including the annular portion 133, the magnetic pole 135B, an air gap 411, the magnetic pole 145A, the annular portion 143, the magnetic pole 145B, an air gap 412, the magnetic pole 135A, and the annular portion 133. When the coil 142 in the stator 140 is excited, a magnetic flux also flows through a path similar to the path of the magnetic circuit 402. The magnetic flux generated by exciting the coil 132 interacts with the magnetic flux generated by exciting the coil 142, resulting in generation of a torque.

In the portion shown in FIG. 5A, passing a current 501 through the coil 132 in the rotor 130 forms a magnetic circuit 502. In the magnetic circuit 502, a magnetic flux flows in a direction shown by arrow 503. In this case, the magnetic flux does not flow in the circumferential direction (corresponding to a direction perpendicular to the sheet of FIG. 5A) in the annular portion 133 of the rotor 130 and the annular portion 143 of the stator 140. The magnetic circuit 502 that is closed in the cross section is formed to be interlinked with the excited coil 132. Specifically, when the coil 132 is excited, a magnetic flux flows through a path including the annular portion 133, the magnetic pole 135B, an air gap 511, the magnetic pole 145B, the annular portion 143, the magnetic pole 145A, an air gap 512, the magnetic pole 135A, and the annular portion 133. When the coil 142 in the stator 140 is excited, a magnetic flux also flows through a path similar to the path of the magnetic circuit 502. The magnetic flux generated by exciting the coil 132 interacts with the magnetic flux generated by exciting the coil 142, resulting in generation of a torque.

Figure 5B:
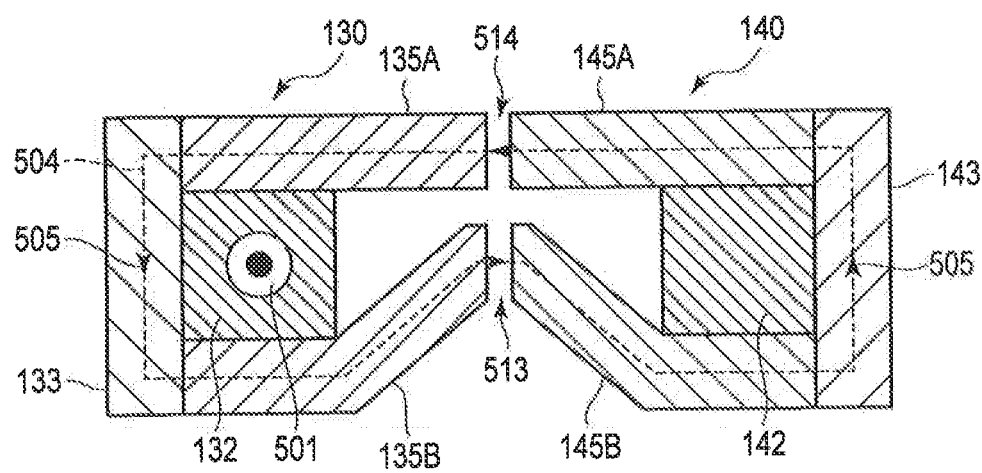

In the portion shown in FIG. 5B, passing the current 501 through the coil 132 in the rotor 130 forms a magnetic circuit 504. In the magnetic circuit 504, a magnetic flux flows in a direction shown by arrow 505. In this case, the magnetic flux does not flow in the circumferential direction (corresponding to a direction perpendicular to the sheet of FIG. 5B) in the annular portion 133 of the rotor 130 and the annular portion 143 of the stator 140. The magnetic circuit 504 that is closed in the cross section is formed to be interlinked with the excited coil 132. Specifically, when the coil 132 is excited, a magnetic flux flows through a path including the annular portion 133, the magnetic pole 135B, an air gap 513, the magnetic pole 145B, the annular portion 143, the magnetic pole 145A, an air gap 514, the magnetic pole 135A, and the annular portion 133. When the coil 142 in the stator 140 is excited, a magnetic flux also flows through a path similar to the path of the magnetic circuit 504. The magnetic flux generated by exciting the coil 132 interacts with the magnetic flux generated by exciting the coil 142, resulting in generation of a torque.

In the first embodiment, the rotor 130 includes the first magnetic pole shape pattern and the second magnetic pole shape pattern periodically alternately repeated in the circumferential direction; in the first magnetic pole shape pattern, the magnetic poles 135A are linear magnetic poles, and the magnetic poles 135B are bent magnetic poles, and in the second magnetic pole shape pattern, the magnetic poles 135A are bent magnetic poles, and the magnetic poles 135B are linear magnetic poles. Moreover, the stator 140 includes the third magnetic pole shape pattern and the fourth magnetic pole shape pattern periodically alternately repeated in the circumferential direction; in the third magnetic pole shape pattern, the magnetic poles 145A are linear magnetic poles, and the magnetic poles 145B are bent magnetic poles, and in the fourth magnetic pole shape pattern, the magnetic poles 145A are bent magnetic poles, and the magnetic poles 145B are linear magnetic poles. Thus, when the coils 132 and 142 are excited, either the magnetic circuit 402 shown in FIG. 4A and FIG. 4B or the magnetic circuit 502 shown in FIG. 5A or the magnetic circuit 504 shown in FIG. 5B is formed in any cross section of the rotating electrical machine 100.

Specifically, when, in a certain cross section, the positional relation between the rotor 130 and the stator 140 is such that the rotor 130 and the stator 140 are symmetric with respect to the intermediate plane between the rotor 130 and the stator 140 as shown in FIG. 5A, the magnetic pole 135A lies opposite the magnetic pole 145A, and the magnetic pole 135B lies opposite the magnetic pole 145B. Thus, the closed magnetic circuit 502 is formed in the cross section. Similarly, when, in another cross section, the positional relation between the rotor 130 and the stator 140 is such that the rotor 130 and the stator 140 are symmetric with respect to the intermediate plane between the rotor 130 and the stator 140 as shown in FIG. 5B, the magnetic pole 135A lies opposite the magnetic pole 145A, and the magnetic pole 135B lies opposite the magnetic pole 145B. Thus, the closed magnetic circuit 504 is formed in the cross section. Moreover, in cross sections where the closed magnetic circuits 502 and 504 are not generated, the magnetic circuit 402 is formed through the set of the bent magnetic poles 135A and 145B, the set of the bent magnetic poles 135B and 145A, and the annular portions 133 and 143 as shown in FIG. 4A and FIG. 4B. Thus, according to the first embodiment, the magnetic circuit is formed in all cross sections, enabling a reduction in the leakage of a magnetic field to allow a large area to be secured for the magnetic poles. As a result, an increased torque can be provided.

Moreover, the first embodiment allows the magnetic poles 135A, the magnetic poles 135B, and the annular portion 133 of the rotor 130 to be integrally formed together and the magnetic poles 145A, the magnetic poles 145B and allows the annular portion 143 of the stator 140 to be integrally molded together, allowing the mechanical strength of the rotor 130 and the stator 140 to be improved. Furthermore, when the coils 132 and 142 annularly wound around the rotor 130 and the stator 140, respectively, are mounted in the machine, the number of assembly steps can be reduced. Furthermore, unlike in conventional rotating electrical machines which uses permanent magnets, the provision of the field coil (coil 132 or 142) prevents a possible copper loss caused by a negative direct axis current in the armature coil and possible demagnetization of the permanent magnets caused by a reversed magnetic field resulting from the negative direct axis current when a magnetic field suitable for a driving speed is controlled. Additionally, driving is enabled over a wide variable speed range.

As described above, in the rotating electrical machine 100 according to the first embodiment, the leading end of one of the magnetic poles 135A and 135B provided in the rotor 130 is bent toward the central side of the intermediate plane between the rotor 130 and the stator 140. The leading end of one of the magnetic poles 145A and 145B provided in the stator 140 is bent toward the central side of the intermediate plane between the rotor 130 and the stator 140. Thus, excitation of the coils 132 and 142 allows the magnetic circuit to be formed in all cross sections. As a result, a high torque can be generated.

Second Embodiment

The basic structure of a rotating electrical machine according to a second embodiment is similar to the basic structure of the rotating electrical machine according to the first embodiment. However, the second embodiment is different from the first embodiment in that the armature coil is mechanically separated from the rotor.

Figure 6:
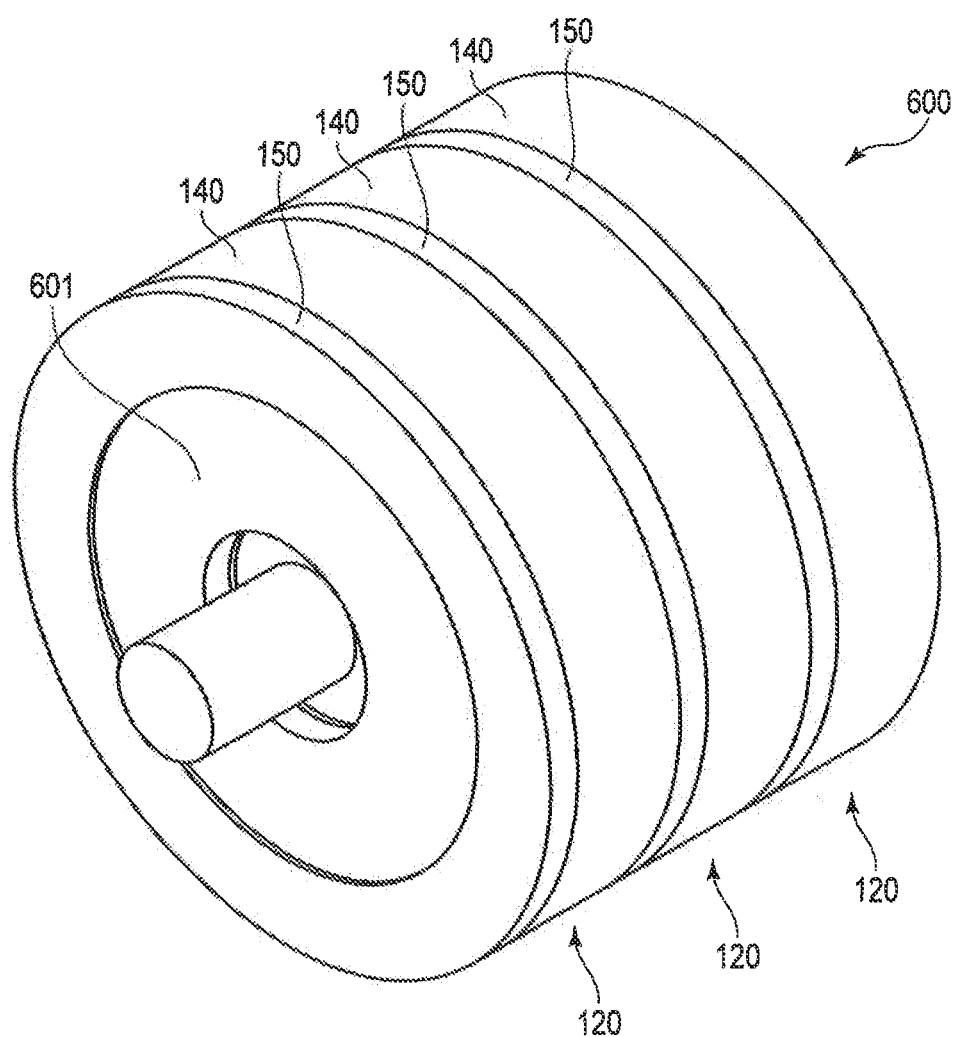
FIG. 6 is a perspective view schematically showing a rotating electrical machine according to a second embodiment.
Figure 7:
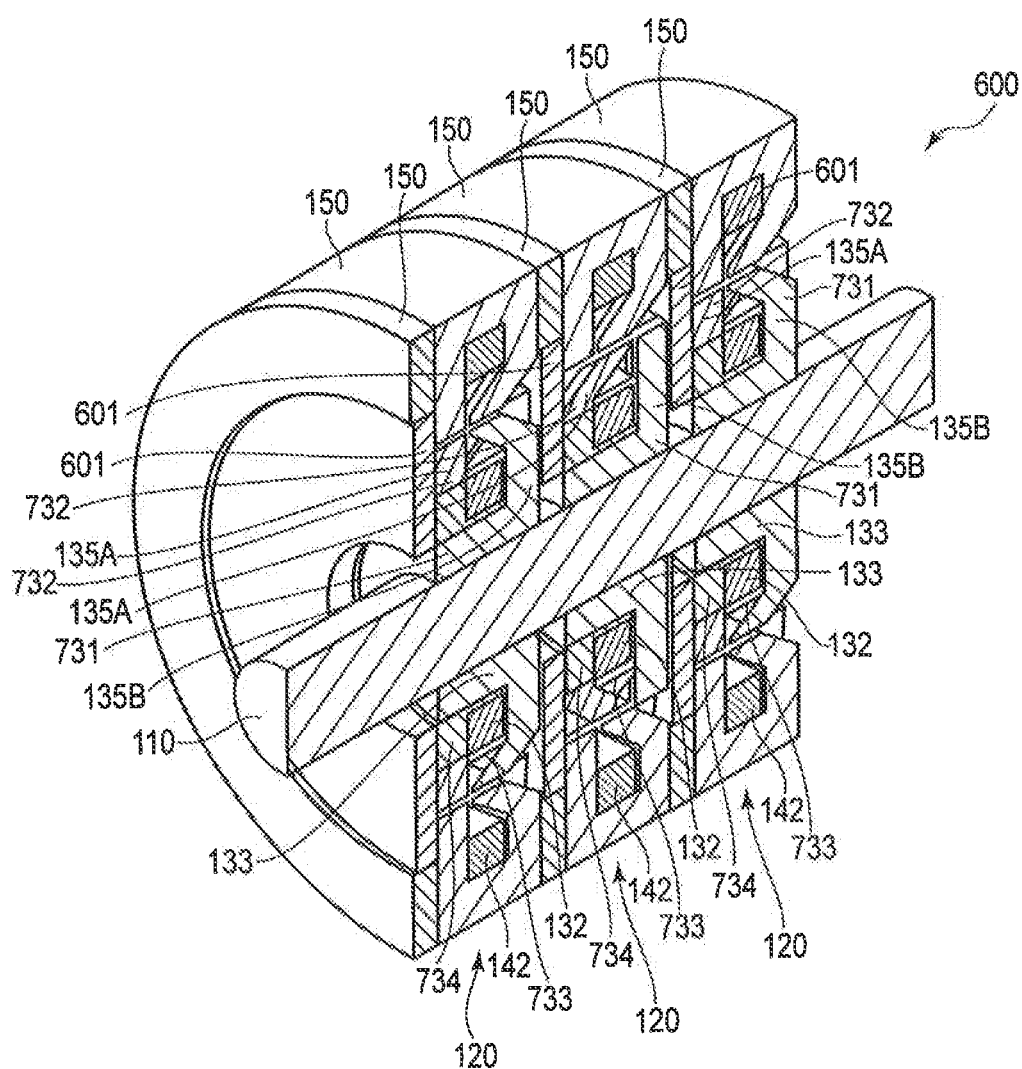
FIG. 7 is a cross-sectional perspective view showing a general structure of a rotor and a stator both shown in FIG. 6.
Figure 8:
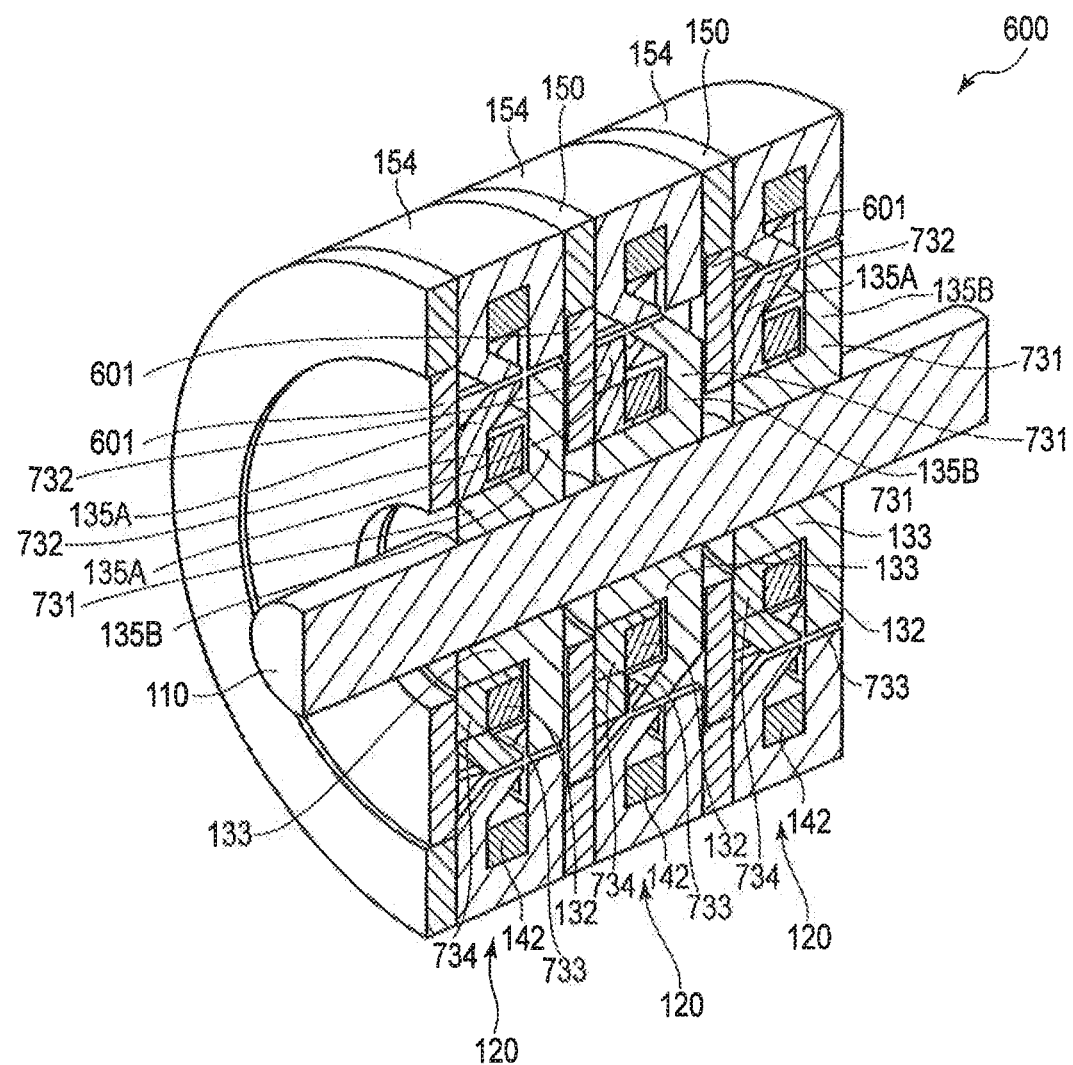
FIG. 8 is a cross-sectional perspective view showing a general structure of the rotor and the stator both shown in FIG. 6, in a cross section different from the cross section in FIG. 7 by a pole pitch.

FIG. 6 is a perspective view schematically showing a rotating electrical machine 600 according to the second embodiment. FIG. 7 and FIG. 8 are cross-sectional perspective views showing a general structure of a rotor 130 and a stator 140. A cross section shown in FIG. 8 is inclined at an angle corresponding to a pole pitch, to a cross section shown in FIG. 7. Moreover, FIG. 9A and FIG. 9B and FIG. 10A and FIG. 10B are partial cross-sectional views of the rotating electrical machine 600.

In the rotating electrical machine 600 shown in FIG. 6, the rotor 130 includes annular ferromagnetic substances 731 and 732 and an annular nonmagnetic substance 733 that mechanically couples the ferromagnetic substances 731 and 732 together, as shown in FIG. 7 and FIG. 8. The ferromagnetic substance 731 includes an annular portion 133 and a plurality of magnetic poles 135B extending from the annular portion 133 toward the stator 140. The magnetic poles 135A are coupled to the magnetic poles 135B by the nonmagnetic substance 733.

A ferromagnetic substance 734 and a coil 132 attached to the ferromagnetic substance 734 are interposed between the ferromagnetic substances 731 and 732. More specifically, the ferromagnetic substance 734 is disposed between the ferromagnetic substance 732 and the annular portion 133. The coil 132 is disposed in a space defined by the ferromagnetic substance 731, the nonmagnetic substance 733, and the ferromagnetic substance 734. The ferromagnetic substance 734 and the coil 132 are each shaped like a ring centered around a rotating shaft 110 so as not to come into contact with the rotating rotor 130. The ferromagnetic substance 734 is fixed to the stator 140 via a nonmagnetic coupling member 601 and a nonmagnetic coupling member 150. In the second embodiment, the coil 132 is separated from the rotor 130, eliminating the need to provide a slip ring.

Figure 9A:
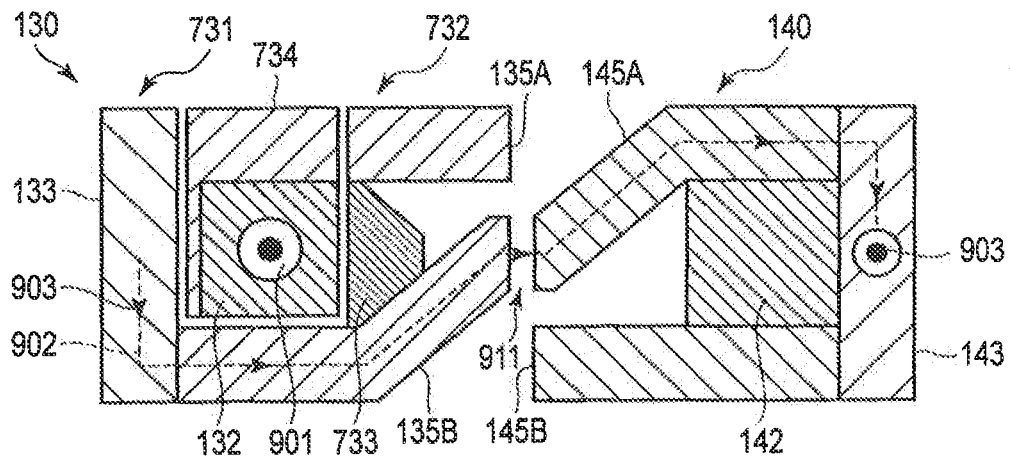
FIG. 9A and FIG. 9B are partial cross-sectional views of the rotating electrical machine in FIG. 6.
Figure 9B:
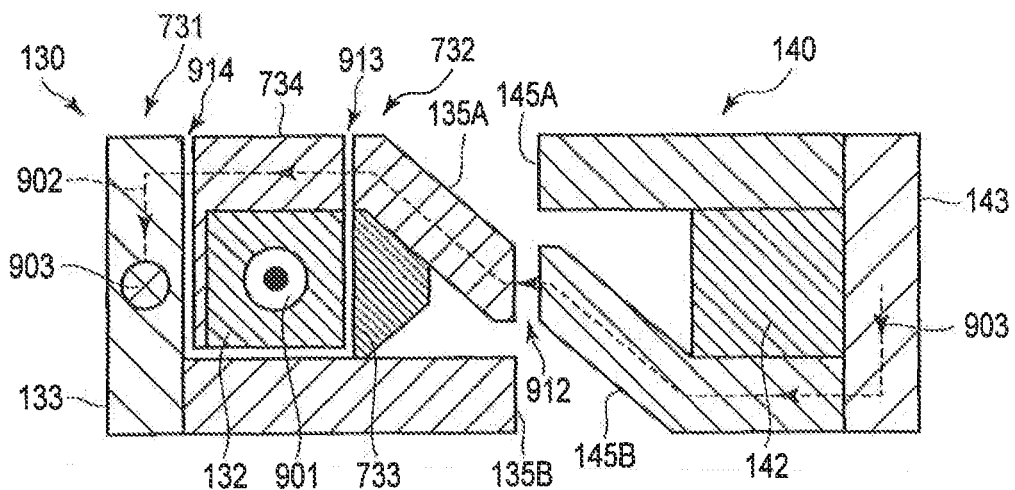
Figure 10A:
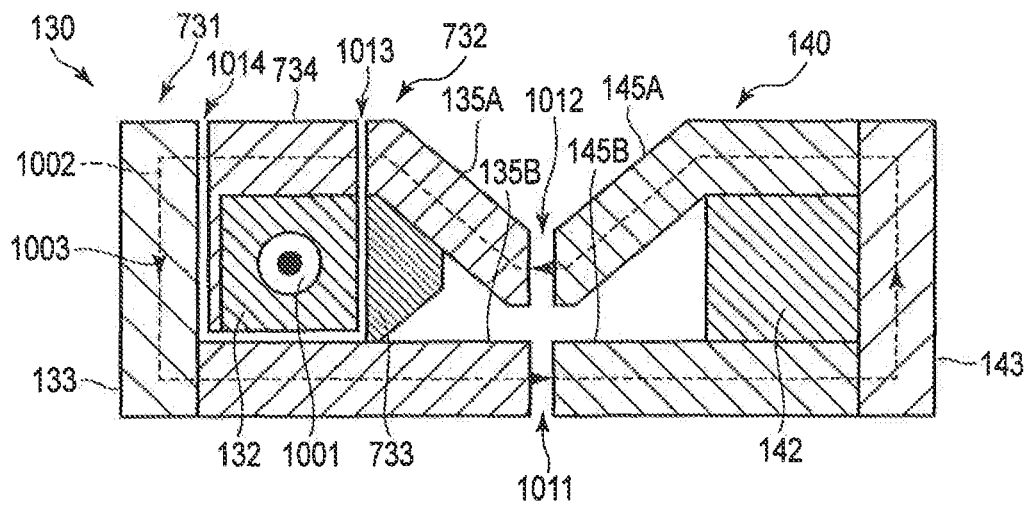
FIG. 10A and FIG. 10B are partial cross-sectional views of the rotating electrical machine in FIG. 6.

At a certain angle of rotation, a portion in which the bent magnetic pole 135B lies opposite the bent magnetic pole 145A as shown in FIG. 9A is located adjacent to a portion in which the bent magnetic pole 135A lies opposite the bent magnetic pole 145B as shown in FIG. 9B. At another angle of rotation, the bent magnetic pole 135A lies opposite the bent magnetic pole 145A, and the linear magnetic pole 135B lies opposite the linear magnetic pole 145B, as shown in FIG. 10A. In a portion adjacent to the portion shown in FIG. 10A, the linear magnetic pole 135A lies opposite the linear magnetic pole 145A, and the bent magnetic pole 135B lies opposite the bent magnetic pole 145B, as shown in FIG. 10B.

In the portions shown in FIG. 9A and FIG. 9B, passing a current 901 through the coil 132 in the rotor 130 forms a magnetic circuit 902, allowing a magnetic flux to flow in a direction shown by arrow 903. The magnetic flux also flows in the circumferential direction (corresponding to a direction perpendicular to the sheet of FIG. 9A and FIG. 9B) in the annular portion 133 of the rotor 130 and the annular portion 143 of the stator 140. Thus, the magnetic circuit 902 is formed across the two portions shown in FIG. 9A and FIG. 9B. The magnetic circuit 902 is formed to be interlinked with the excited coil 132. Specifically, when the coil 132 is excited, a magnetic flux flows through a path including the annular portion 133, the magnetic pole 135B, an air gap 911, the magnetic pole 145A, the annular portion 143, the magnetic pole 145B, an air gap 912, the magnetic pole 135A, an air gap 913, the ferromagnetic substance 734, an air gap 914, and the annular portion 133. When the coil 142 is excited, a magnetic flux also flows through a path similar to the path of the magnetic circuit 902. The magnetic flux generated by exciting the coil 132 interacts with the magnetic flux generated by exciting the coil 142, resulting in generation of a torque.

In the portion shown in FIG. 10A, passing a current 1001 through the coil 132 forms a magnetic circuit 1002. In the magnetic circuit 1002, a magnetic flux flows in a direction shown by arrow 1003. In this case, the magnetic flux does not flow in the circumferential direction (corresponding to a direction perpendicular to the sheet of FIG. 10A) in the annular portion 133 of the rotor 130 and the annular portion 143 of the stator 140. The magnetic circuit 1002 that is closed in the cross section is formed to be interlinked with the excited coil 132. Specifically, when the coil 132 is excited, a magnetic flux flows through a path including the annular portion 133, the magnetic pole 135B, an air gap 1011, the magnetic pole 145B, the annular portion 143, the magnetic pole 145A, an air gap 1012, the magnetic pole 135A, an air gap 1013, the ferromagnetic substance 734, an air gap 1014, and the annular portion 133. When the coil 142 is excited, a magnetic flux also flows through a path similar to the path of the magnetic circuit 1002. The magnetic flux generated by exciting the coil 132 interacts with the magnetic flux generated by exciting the coil 142, resulting in generation of a torque.

Figure 10B:
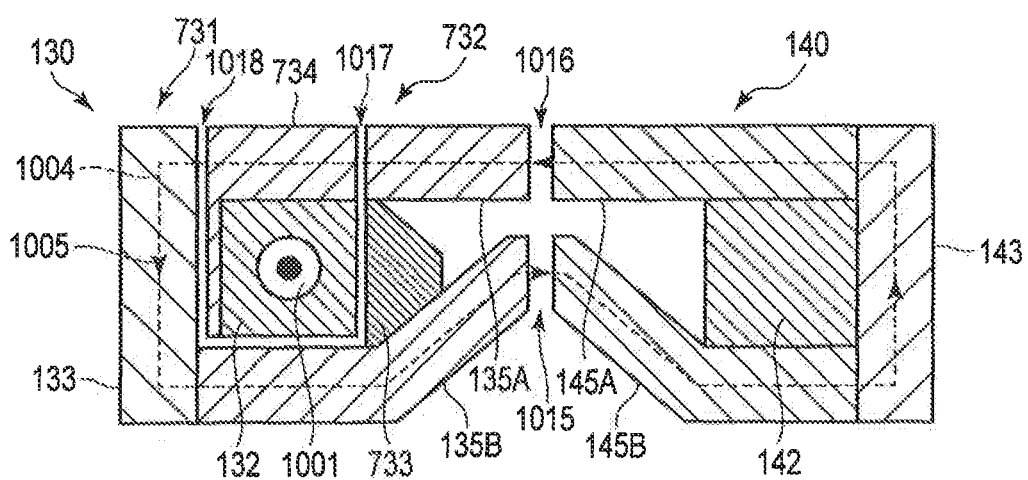

In the portion shown in FIG. 10B, passing a current 1001 through the coil 132 forms a magnetic circuit 1004. In the magnetic circuit 1004, a magnetic flux flows in a direction shown by arrow 1005. In this case, the magnetic flux does not flow in the circumferential direction (corresponding to a direction perpendicular to the sheet of FIG. 10B) in the annular portion 133 of the rotor 130 and the annular portion 143 of the stator 140. The magnetic circuit 1004 that is closed in the cross section is formed to be interlinked with the excited coil 132. Specifically, when the coil 132 is excited, a magnetic flux flows through a path including the annular portion 133, the magnetic pole 135B, an air gap 1015, the magnetic pole 145B, the annular portion 143, the magnetic pole 145A, an air gap 1016, the magnetic pole 135A, an air gap 1017, the ferromagnetic substance 734, an air gap 1018, and the annular portion 133. When the coil 142 is excited, a magnetic flux also flows through a path similar to the path of the magnetic circuit 1004. The magnetic flux generated by exciting the coil 132 interacts with the magnetic flux generated by exciting the coil 142, resulting in generation of a torque.

In the second embodiment, when the coils 132 and 142 are excited, either the magnetic circuit 902 shown in FIG. 9A and FIG. 9B or the magnetic circuit 1002 shown in FIG. 10A or the magnetic circuit 1004 shown in FIG. 10B is formed in any cross section of the rotating electrical machine 600. As a result, an increased torque can be provided.

The rotating electrical machine 600 according to the second embodiment can generate a high torque as is the case with the first embodiment. Moreover, the second embodiment eliminates the need for a slip ring for power supply to the coil 132. This obviates the need for maintenance work to deal with wear of the slip ring or the like, improving the reliability of rotational operation over a long period. Furthermore, the lack of the slip ring allows a corresponding reduction in the size of the rotating electrical machine 600.

Third Embodiment

The basic structure of a rotating electrical machine according to a third embodiment is similar to the basic structure of the rotating electrical machine according to the first embodiment. However, the third embodiment is different from the first embodiment in the structure of the rotor.

Figure 11:
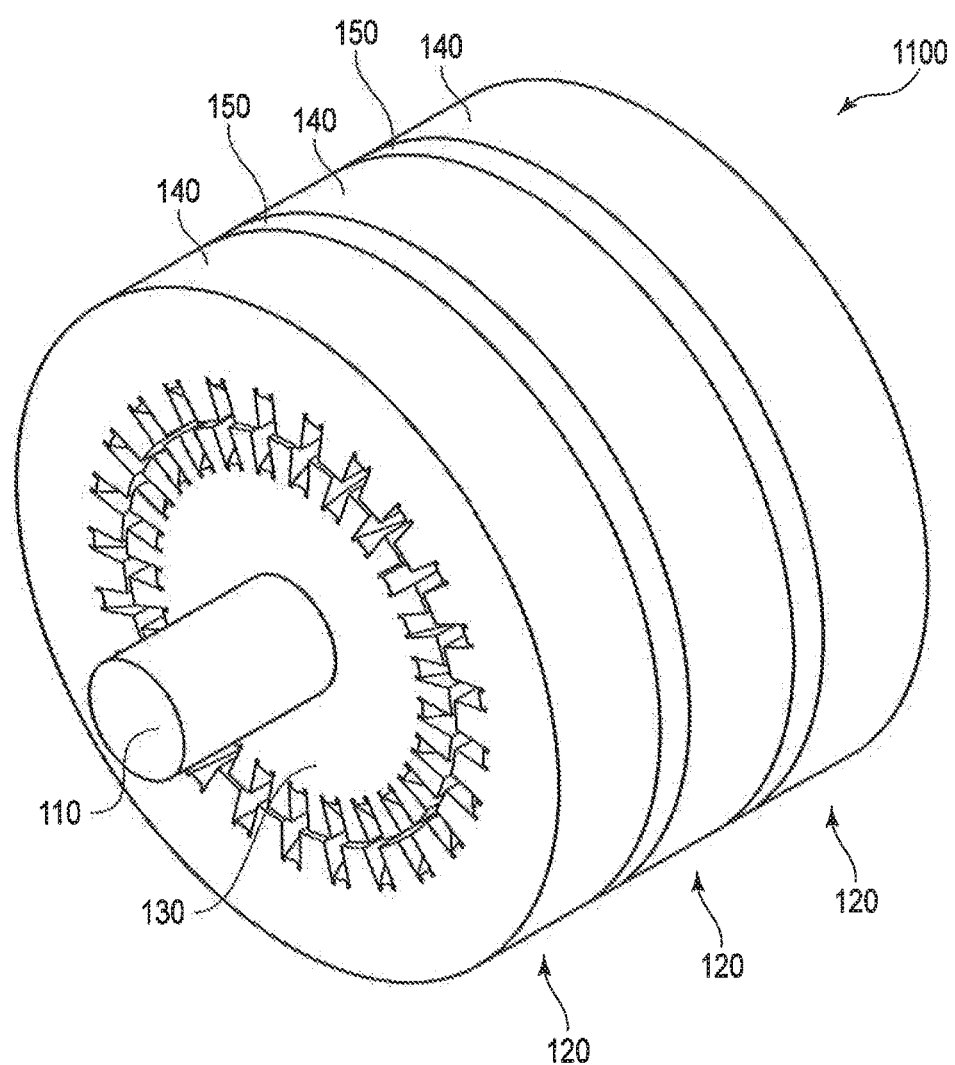
FIG. 11 is a perspective view schematically showing a rotating electrical machine according to a third embodiment.
Figure 12:
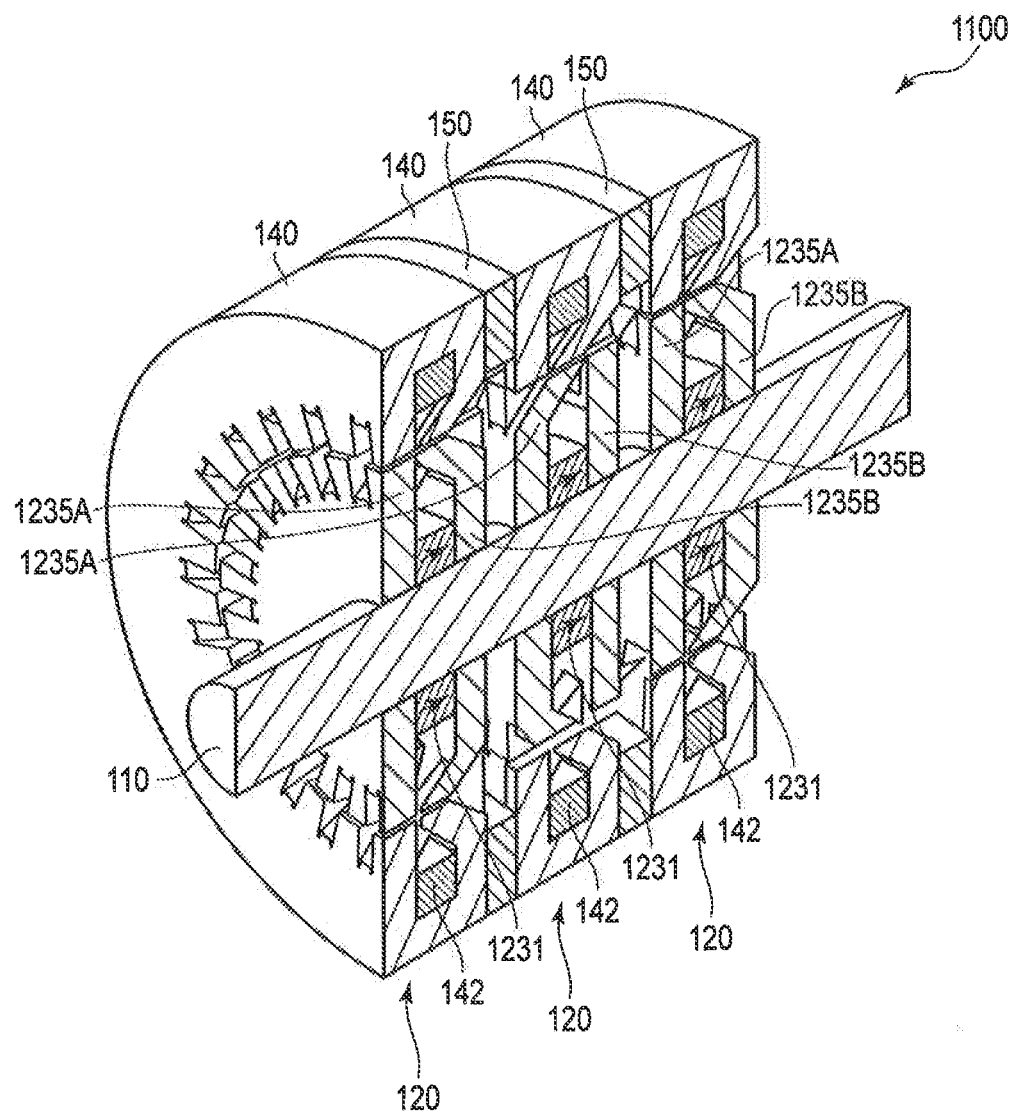
FIG. 12 is a cross-sectional perspective view showing a general structure of a rotor and a stator both shown in FIG. 11.
Figure 13:
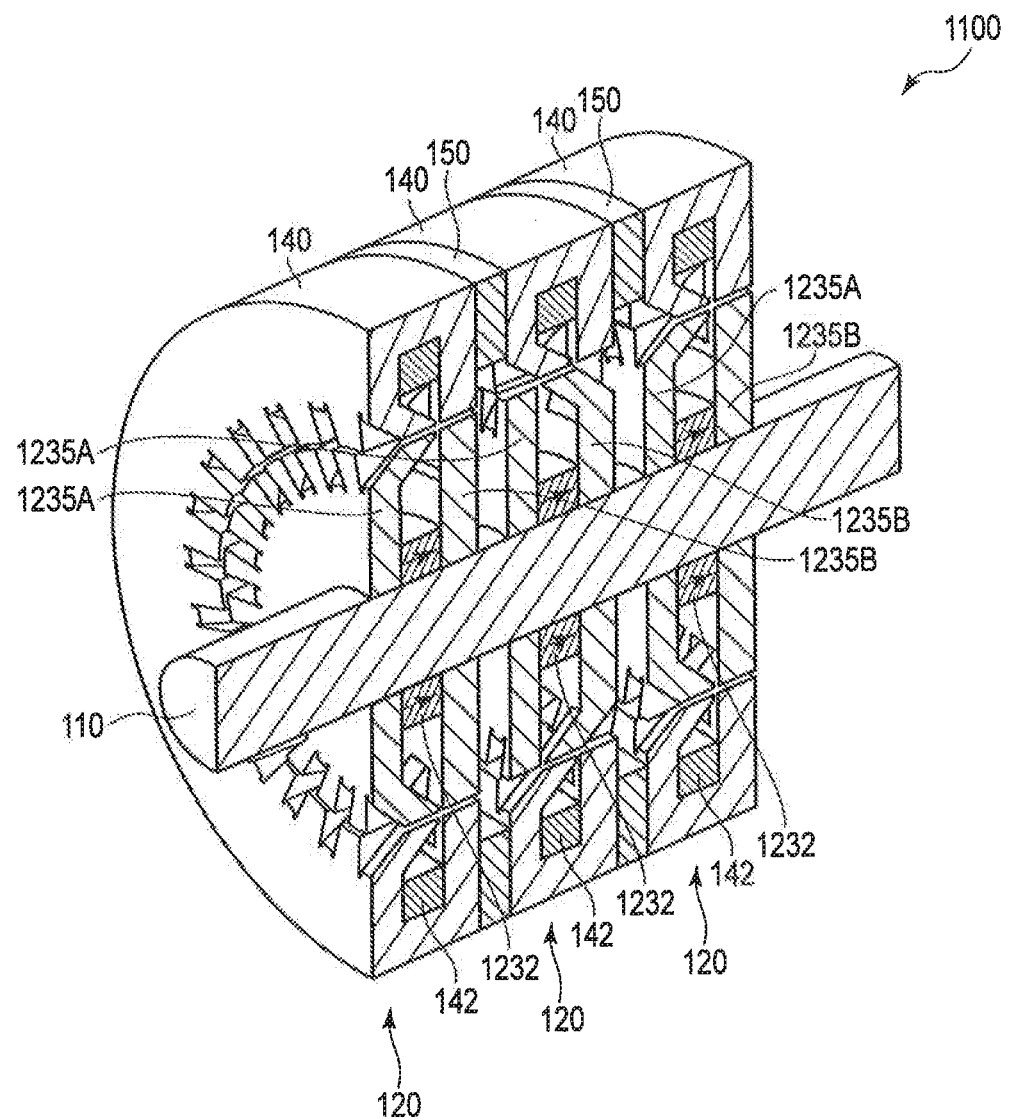
FIG. 13 is a cross-sectional perspective view showing a general structure of the rotor and the stator both shown in FIG. 11, in a cross section different from the cross section in FIG. 12 by a pole pitch.

FIG. 11 is a perspective view schematically showing a rotating electrical machine 1100 according to the third embodiment. FIG. 12 and FIG. 13 are cross-sectional perspective views showing a general structure of a rotor 130 and a stator 140. A cross section shown in FIG. 13 is inclined at an angle corresponding to a pole pitch to a cross section shown in FIG. 12. Moreover, FIG. 14A and FIG. 14B and FIG. 15A and FIG. 15B are partial cross-sectional views of the rotating electrical machine 1100.

In the rotating electrical machine 1100 shown in FIG. 11, the rotor 130 includes an annular magnetic field generation part 1231, a plurality of magnetic poles 1235A extending from an end of the magnetic field generation part 1231 toward the stator 140, and a plurality of magnetic poles 1235B extending from another end of the magnetic field generation part 1231 toward the stator 140, as shown in FIG. 12 and FIG. 13. The magnetic field generation part 1231 is interposed between the magnetic poles 1235A and 1235B. The plurality of magnetic poles 1235A lie opposite the plurality of magnetic poles 1235B, respectively. Each of the magnetic poles 1235A is paired with the axially opposite magnetic pole 1235B in the axial direction. One of the paired magnetic poles 1235A and 1235B extends linearly in the radial direction. The other magnetic pole is bent such that a leading end of the magnetic pole lies opposite a central portion of an inner peripheral surface of the stator 140. The inner peripheral surface of the stator 140 faces an outer peripheral surface of the rotor 130. The magnetic field generation part 1231 is, for example, a permanent magnet and generates a magnetic field in the axial direction. The magnetic flux generated by the magnetic field generation part 1231 is utilized as a field. The magnetic poles 1235A and 1235B are each formed of a ferromagnetic substance. The rotor 130 according to the third embodiment corresponds to the rotor 130 according to the first embodiment in which the magnetic field generation part 1231 is provided in a central portion of the annular portion 133 and from which the coil 132 is removed.

At a certain angle of rotation, a portion in which a bent magnetic pole 1235B of the rotor 130 lies opposite a bent magnetic pole 145A of the stator 140 as shown in FIG. 14A is located adjacent to a portion in which a bent magnetic pole 1235A of the rotor 130 lies opposite a bent magnetic pole 145B of the stator 140 as shown in FIG. 14B. The magnetic field generation part 1231 generates a magnetic field in a direction shown by arrow 1403. Consequently, a magnetic circuit 1402 is formed. In the magnetic circuit 1402, a magnetic flux flows in a direction shown by arrow 1404. Specifically, a magnetic flux flows through a path including the magnetic pole 1235B, an air gap 1411, the magnetic pole 145A, an annular portion 143, the magnetic pole 145B, an air gap 1412, the magnetic pole 1235A, the magnetic field generation part 1231, and the magnetic pole 1235B. The magnetic circuit 1402 corresponds to the magnetic circuit 402 (FIG. 4A and FIG. 4B) formed by excitation of the coil 132 as in the first embodiment. According to the third embodiment, the magnetic flux generated by the magnetic field generation part 1231 interacts with the magnetic flux generated by exciting the coil 142, resulting in generation of a torque.

Figure 15A:
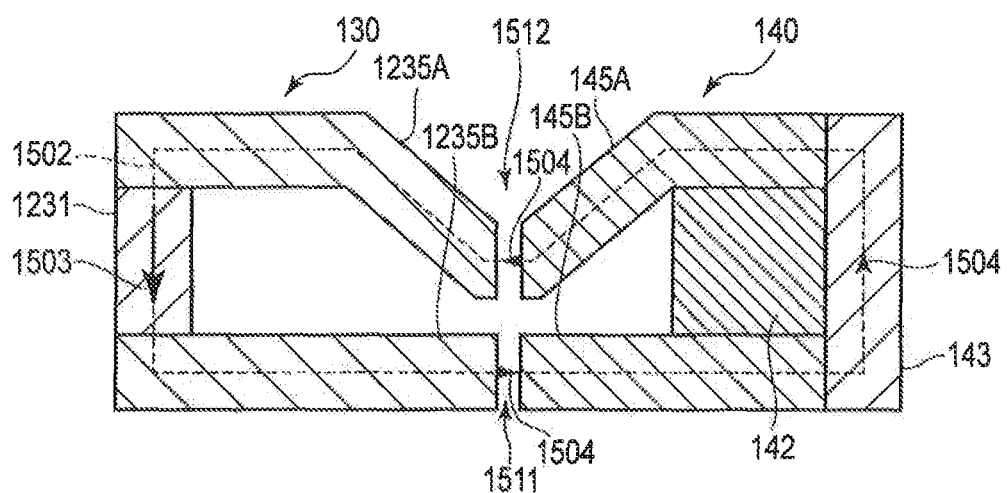
FIG. 15A and FIG. 15B are partial cross-sectional views of the rotating electrical machine in FIG. 11.

At another angle of rotation, the bent magnetic pole 1235A of the rotor 130 lies opposite the bent magnetic pole 145A of the stator 140, and the linear magnetic pole 1235B of the rotor 130 lies opposite the linear magnetic pole 145B of the stator 140, as shown in FIG. 15A. In a portion adjacent to the portion shown in FIG. 15A, the linear magnetic pole 1235A lies opposite the linear magnetic pole 145A, and the bent magnetic pole 1235B lies opposite the bent magnetic pole 145B, as shown in FIG. 15B.

In the portion shown in FIG. 15A, the magnetic field generation part 1231 generates a magnetic field in a direction shown by arrow 1503. Consequently, a magnetic circuit 1502 is formed. In the magnetic circuit 1502, a magnetic flux flows in a direction shown by arrow 1504. Specifically, a magnetic flux flows through a path including the magnetic pole 1235B, an air gap 1511, the magnetic pole 145B, the annular portion 143, the magnetic pole 145A, an air gap 1512, the magnetic pole 1235A, and the magnetic field generation part 1231. The magnetic circuit 1502 corresponds to the magnetic circuit 502 (FIG. 5A) formed by excitation of the coil 132 as in the first embodiment. The magnetic flux generated by the magnetic field generation part 1231 interacts with the magnetic flux generated by exciting the coil 142, resulting in generation of a torque.

Figure 15B:
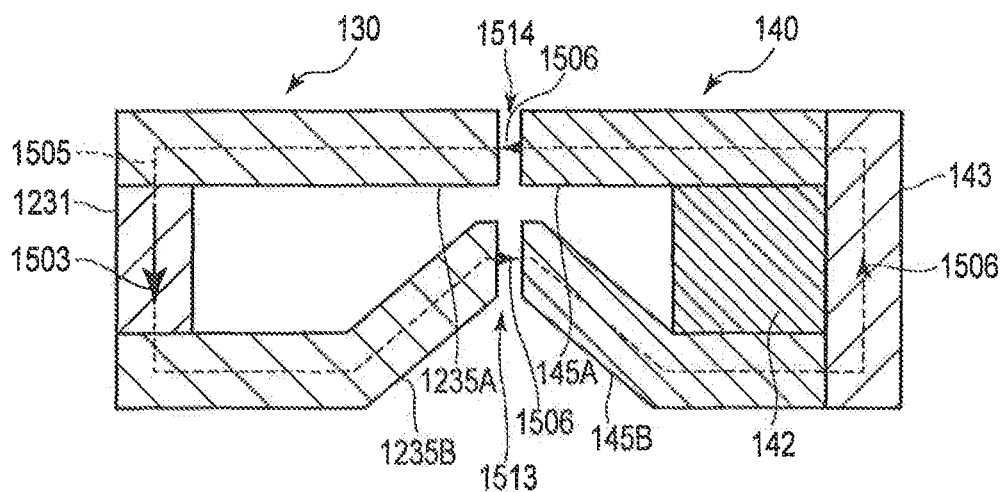

In the portion shown in FIG. 15B, the magnetic field generation part 1231 generates a magnetic field in a direction shown by arrow 1503. Consequently, a magnetic circuit 1505 is formed. In the magnetic circuit 1505, a magnetic flux flows in a direction shown by arrow 1506. Specifically, a magnetic flux flows through a path including the magnetic pole 1235B, an air gap 1513, the magnetic pole 145B, the annular portion 143, the magnetic pole 145A, an air gap 1514, the magnetic pole 1235A, and the magnetic field generation part 1231. The magnetic circuit 1505 corresponds to the magnetic circuit 504 (FIG. 5B) formed by excitation of the coil 132 as in the first embodiment. The magnetic flux generated by the magnetic field generation part 1231 interacts with the magnetic flux generated by exciting the coil 142, resulting in generation of a torque.

In the third embodiment, when the coil 142 is excited, either the magnetic circuit 1402 shown in FIG. 14A and FIG. 14B or the magnetic circuit 1502 shown in FIG. 15A or the magnetic circuit 1505 shown in FIG. 15B is formed in any cross section of the rotating electrical machine 1100. As a result, an increased torque can be provided.

The rotating electrical machine 1100 according to the third embodiment can generate a high torque as is the case with the first embodiment. Moreover, the magnetic field generation part 1231 provided in the rotor 130 eliminates the need for a coil mounted on the rotor 130 and a slip ring for power supply to the coil. This obviates the need for maintenance work to deal with wear of the slip ring or the like, improving the reliability of rotating operations over a long period. Furthermore, the lack of the slip ring allows a corresponding reduction in the size of the rotating electrical machine 1100.

Fourth Embodiment

The basic structure of a rotating electrical machine according to a fourth embodiment is similar to the basic structure of the rotating electrical machine according to the first embodiment. However, the fourth embodiment is different from the first embodiment in the structure of the stator.

Figure 16:
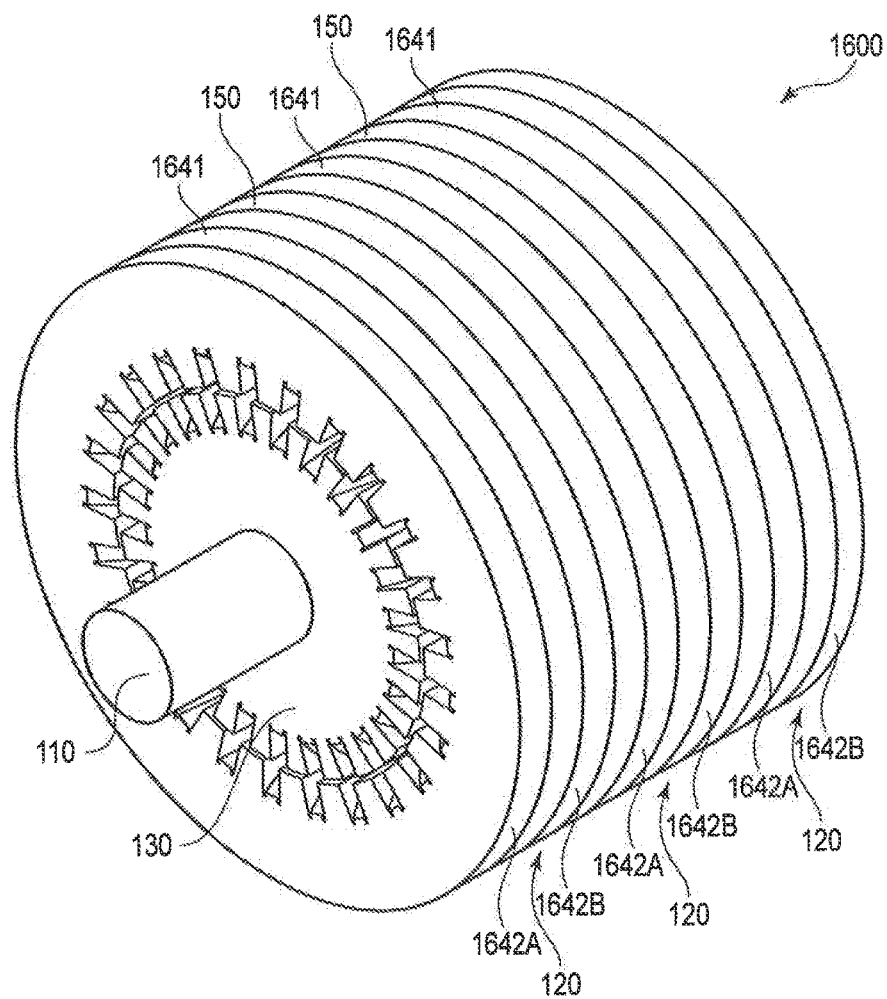
FIG. 16 is a perspective view schematically showing a rotating electrical machine according to a fourth embodiment.
Figure 17:
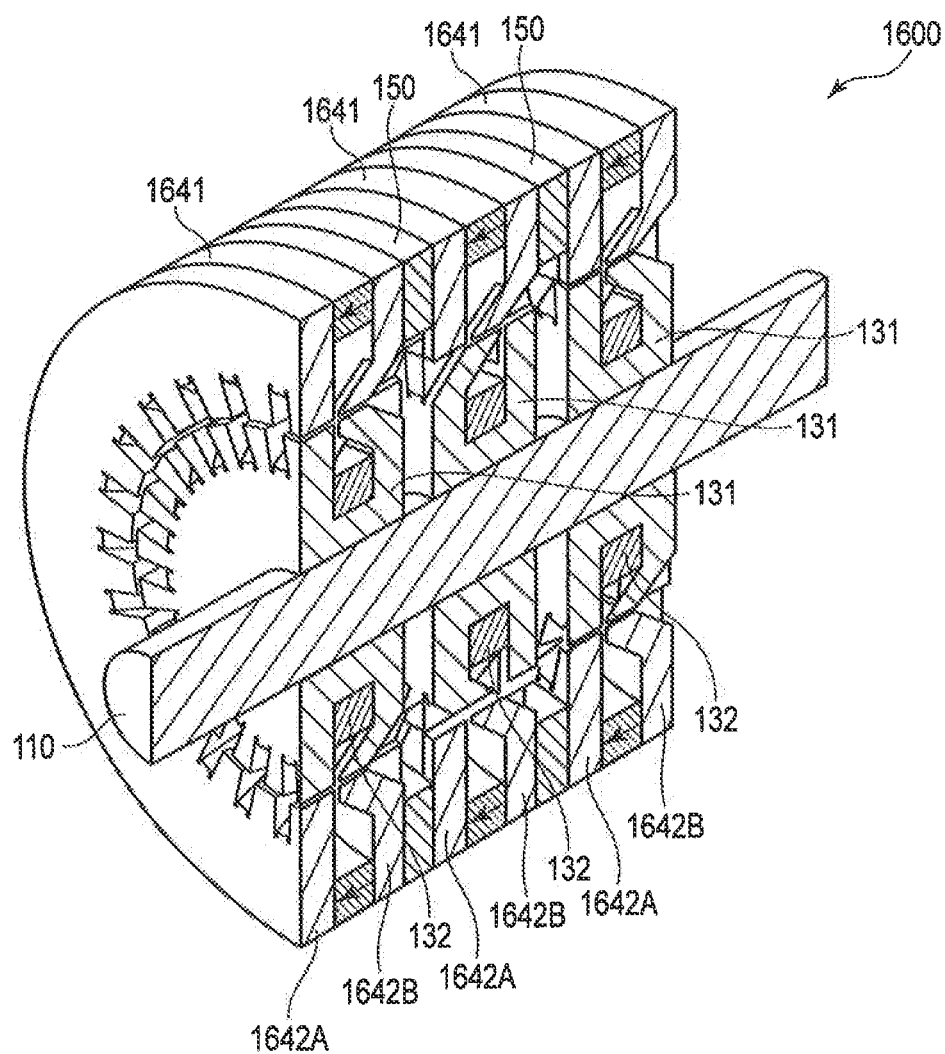
FIG. 17 is a cross-sectional perspective view showing a general structure of a rotor and a stator both shown in FIG. 16.
Figure 18:
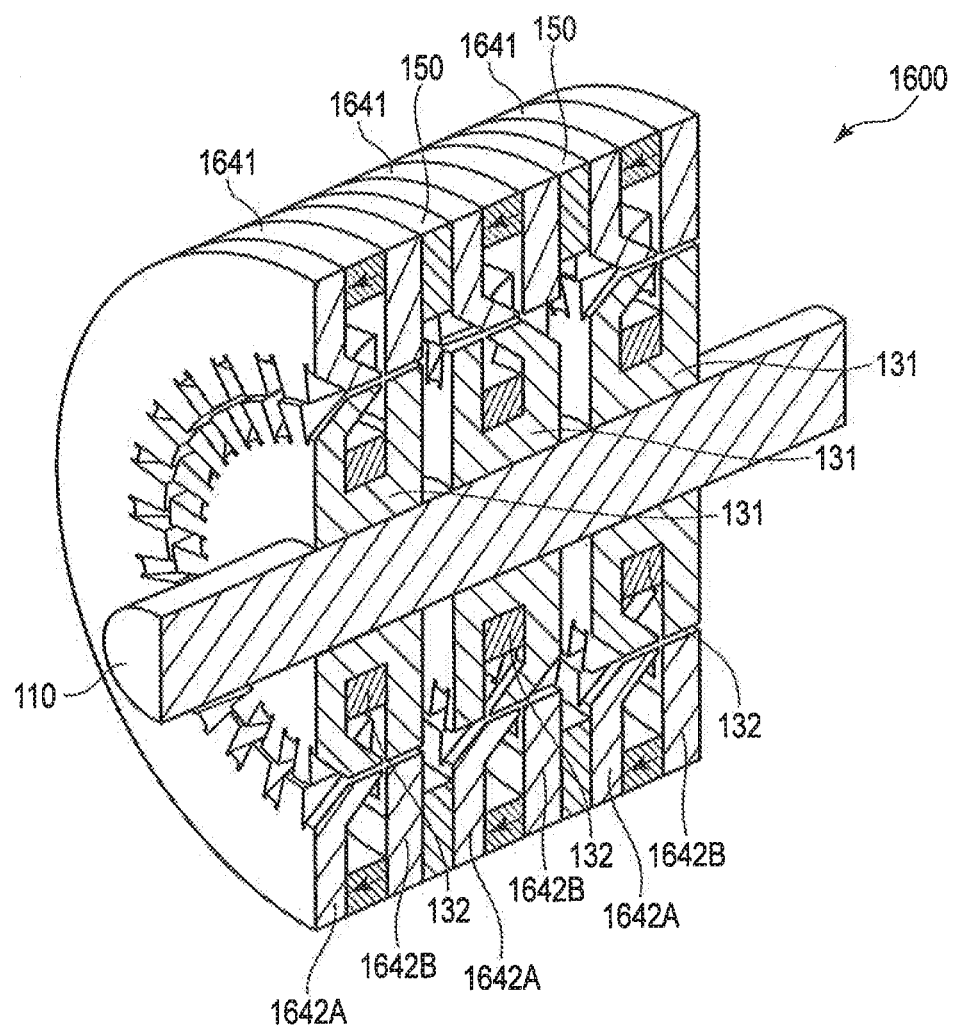
FIG. 18 is a cross-sectional perspective view showing a general structure of the rotor and the stator both shown in FIG. 16, in a cross section different from the cross section in FIG. 17 by a pole pitch.

FIG. 16 is a perspective view schematically showing a rotating electrical machine 1600 according to the fourth embodiment. FIG. 17 and FIG. 18 are cross-sectional perspective views showing a general structure of a rotor 130 and a stator 140. A cross section shown in FIG. 17 is inclined at an angle corresponding to a pole pitch, to a cross section shown in FIG. 18. Moreover, FIG. 19A and FIG. 19B and FIG. 20A and FIG. 20B are partial cross-sectional views of the rotating electrical machine 1600.

In the rotating electrical machine 1600 shown in FIG. 16, the stator 140 includes an annular magnetic field generation part 1641, a plurality of magnetic poles 1642A extending from an end of the magnetic field generation part 1641 toward the rotor 130, and a plurality of magnetic poles 1642B extending from another end of the magnetic field generation part 1641 toward the rotor 130, as shown in FIG. 17 and FIG. 18. The magnetic field generation part 1641 is interposed between the magnetic poles 1642A and 1642B. The plurality of magnetic poles 1642A lie opposite the plurality of magnetic poles 1642B, respectively. Each of the magnetic poles 1642A is paired with the axially opposite magnetic pole 1642B in the axial direction. One of the paired magnetic poles 1642A and 1642B extends linearly in the radial direction. The other magnetic pole is bent such that a leading end of the magnetic pole lies opposite a central portion of an outer peripheral surface of the rotor 130, which faces an inner peripheral surface of the stator 140. The magnetic field generation part 1641 is, for example, a permanent magnet and generates a magnetic field in the axial direction. The magnetic flux generated by the magnetic field generation part 1641 is utilized as a field. The magnetic poles 1642A and 1642B are each formed of a ferromagnetic substance. The stator 140 according to the fourth embodiment corresponds to the stator 140 according to the first embodiment in which the magnetic field generation part 1641 is provided in a central portion of the annular portion 143 and from which the coil 142 is removed.

Figure 19A:
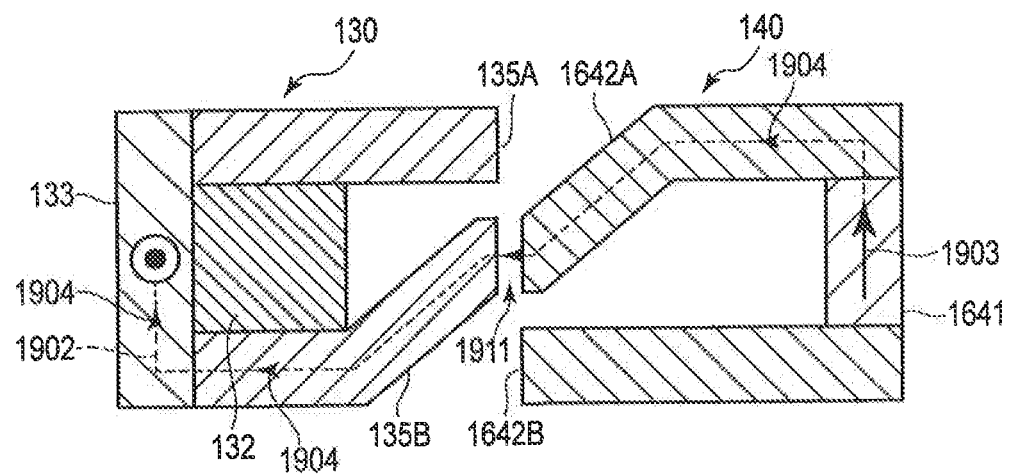
FIG. 19A and FIG. 19B are partial cross-sectional views of the rotating electrical machine in FIG. 16.
Figure 19B:
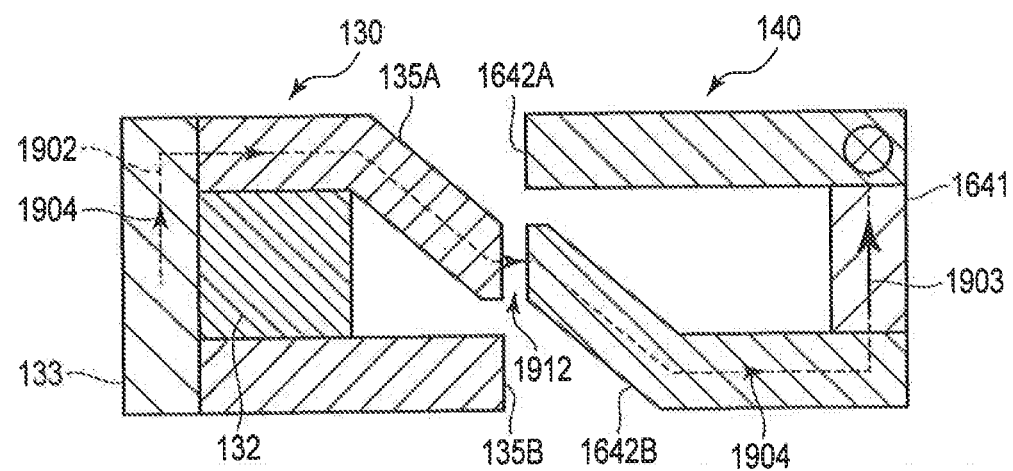

At a certain angle of rotation, a portion in which a bent magnetic pole 135B of the rotor 130 lies opposite the bent magnetic pole 1642A of the stator 140 as shown in FIG. 19A is located adjacent to a portion in which a bent magnetic pole 135A of the rotor 130 lies opposite the bent magnetic pole 1642B of the stator 140 as shown in FIG. 19B. The magnetic field generation part 1641 generates a magnetic field in a direction shown by arrow 1903. Consequently, a magnetic circuit 1902 is formed. In the magnetic circuit 1902, a magnetic flux flows in a direction shown by arrow 1904. Specifically, a magnetic flux flows through a path including the magnetic field generation part 1641, the magnetic pole 1642B, an air gap 1911, the magnetic pole 135B, an annular portion 133, the magnetic pole 135A, an air gap 1912, the magnetic pole 1642B, and the magnetic field generation part 1641. The magnetic circuit 1902 corresponds to the magnetic circuit 402 (FIG. 4A and FIG. 4B) formed by excitation of the coil 142 as in the first embodiment. In the fourth embodiment, the magnetic flux generated by the magnetic field generation part 1641 interacts with the magnetic flux generated by exciting the coil 132, resulting in generation of a torque.

Figure 20A:
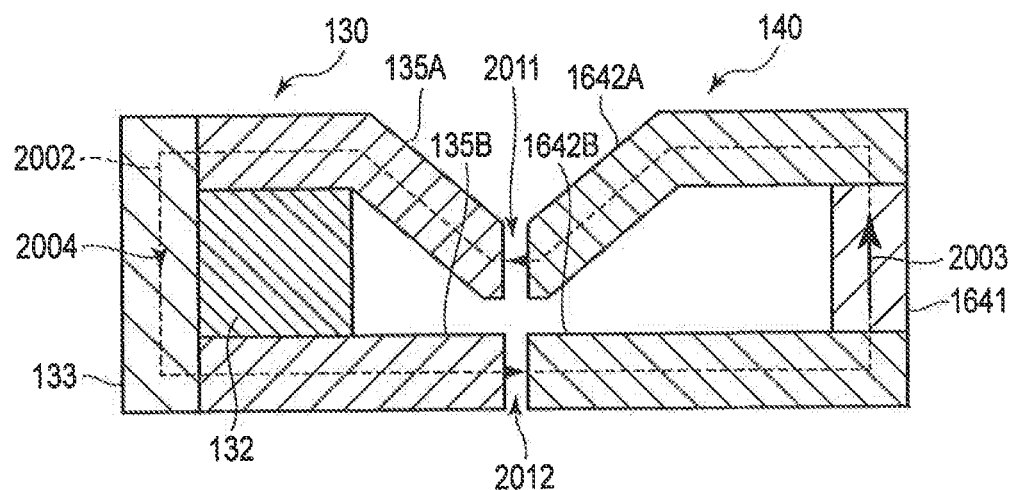
FIG. 20A and FIG. 20B are partial cross-sectional views of the rotating electrical machine in FIG. 16.

At another angle of rotation, the bent magnetic pole 135A of the rotor 130 lies opposite the bent magnetic pole 1642A of the stator 140, and the linear magnetic pole 135B of the rotor 130 lies opposite the linear magnetic pole 1642B of the stator 140, as shown in FIG. 20A. In a portion adjacent to the portion shown in FIG. 20A, the linear magnetic pole 135A lies opposite the linear magnetic pole 1642A, and the bent magnetic pole 135B lies opposite the bent magnetic pole 1642B, as shown in FIG. 20B.

In the portion shown in FIG. 20A, the magnetic field generation part 1641 generates a magnetic field in a direction shown by arrow 2003. Consequently, a magnetic circuit 2002 is formed. In the magnetic circuit 2002, a magnetic flux flows in a direction shown by arrow 2004. Specifically, a magnetic flux flows through a path including the magnetic pole 1642A, an air gap 2011, the magnetic pole 135A, the annular portion 133, the magnetic pole 135B, an air gap 2012, the magnetic pole 1642B, and the magnetic field generation part 1641. The magnetic circuit 2002 corresponds to the magnetic circuit 502 (FIG. 5A) formed by excitation of the coil 142 as in the first embodiment. The magnetic flux generated by the magnetic field generation part 1641 interacts with the magnetic flux generated by exciting the coil 132, resulting in generation of a torque.

Figure 20B:
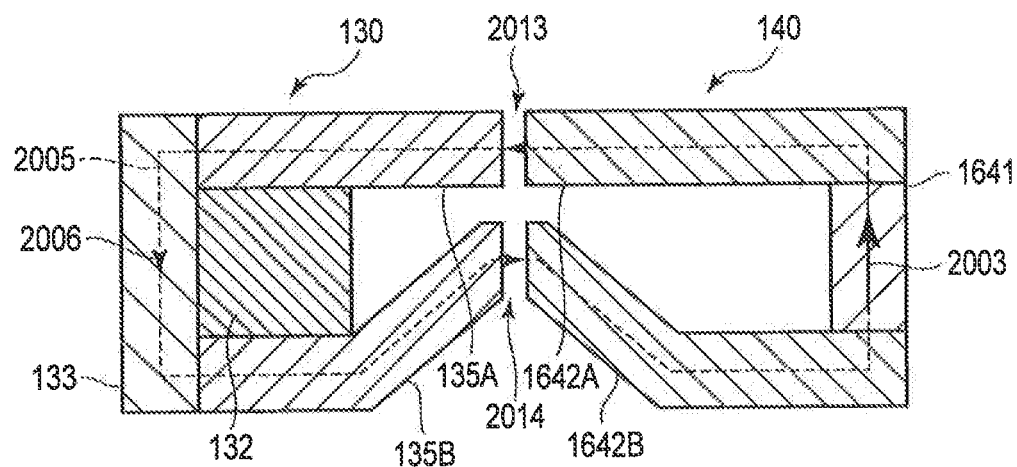

In the portion shown in FIG. 20B, the magnetic field generation part 1641 generates a magnetic field in a direction shown by arrow 2003. Consequently, a magnetic circuit 2005 is formed. In the magnetic circuit 2005, a magnetic flux flows in a direction shown by arrow 2006. Specifically, a magnetic flux flows through a path including the magnetic pole 1642A, an air gap 2013, the magnetic pole 135A, the annular portion 133, the magnetic pole 135B, an air gap 2014, the magnetic pole 1642B, and the magnetic field generation part 1641. The magnetic circuit 2005 corresponds to the magnetic circuit 504 (FIG. 5B) formed by excitation of the coil 142 as in the first embodiment. The magnetic flux generated by the magnetic field generation part 1641 interacts with the magnetic flux generated by exciting the coil 132, resulting in generation of a torque.

According to the fourth embodiment, when the coil 132 is excited, either the magnetic circuit 1902 shown in FIG. 19A and FIG. 19B or the magnetic circuit 2002 shown in FIG. 20A or the magnetic circuit 2005 shown in FIG. 20B is formed in any cross section of the rotating electrical machine 1600. As a result, an increased torque can be provided.

The rotating electrical machine 1600 according to the fourth embodiment can generate a high torque as is the case with the first embodiment. Moreover, the lack of a coil in the stator 140 eliminates the need for power supply to the coil in the stator 140. In general, the magnetic field generation part is preferably disposed on the rotor side in order to eliminate the need for a slip ring.

Fifth Embodiment

In a fifth embodiment, a system for driving a rotating electrical machine will be described.

FIG. 21 schematically shows a rotating electrical machine driving system 2100 according to a fifth embodiment. As shown in FIG. 21, the rotating electrical machine driving system 2100 includes a rotating electrical machine 2101, an angle-of-rotation detection unit 2102, a rotation controller 2103, and a driving circuit unit 2104. The rotating electrical machine 2101 may be the rotating electrical machine described in any of the first to fourth embodiments.

The angle-of-rotation detection unit 2102 detects the angle of rotation around a rotating shaft of a rotor. In an example, the angle-of-rotation detection unit 2102 detects the angle of rotation in an output signal from an angle-of-rotation sensor 2105 mounted on the rotating shaft of the rotating electrical machine 2101. In another example, the angle-of-rotation detection unit 2102 detects the angle of rotation using a voltage and a current output by the driving circuit unit 2104 and a physical model for the rotating electrical machine 2101. The latter detection method is referred to as sensor-less estimation.

The rotation controller 2103 controls the driving circuit unit 2104 based on angle-of-rotation information (also referred to as a detection signal) output by the angle-of-rotation detection unit 2102. Specifically, the rotation controller 2103 determines a voltage to be applied to the driving circuit unit 2104 based on the angle-of-rotation information and an implemented rotation control algorithm. The rotation controller 2103 supplies the voltage to the driving circuit unit 2104.

The driving circuit unit 2104 is supplied with a voltage by the rotation controller 2103 and with power by a power supply apparatus (not shown). The driving circuit unit 2104 then supplies current to an armature coil and a field coil. For example, when the rotating electrical machine 2101 is the rotating electrical machine 100 (FIG. 1) described in the first embodiment, the armature coil corresponds to the coil 132 of the rotor 130, and the field coil corresponds to the coil 142 in the stator 140. The current supplied applies a torque to the rotor of the rotating electrical machine 2101 to drive the rotating electrical machine 2101.

Figure 22:
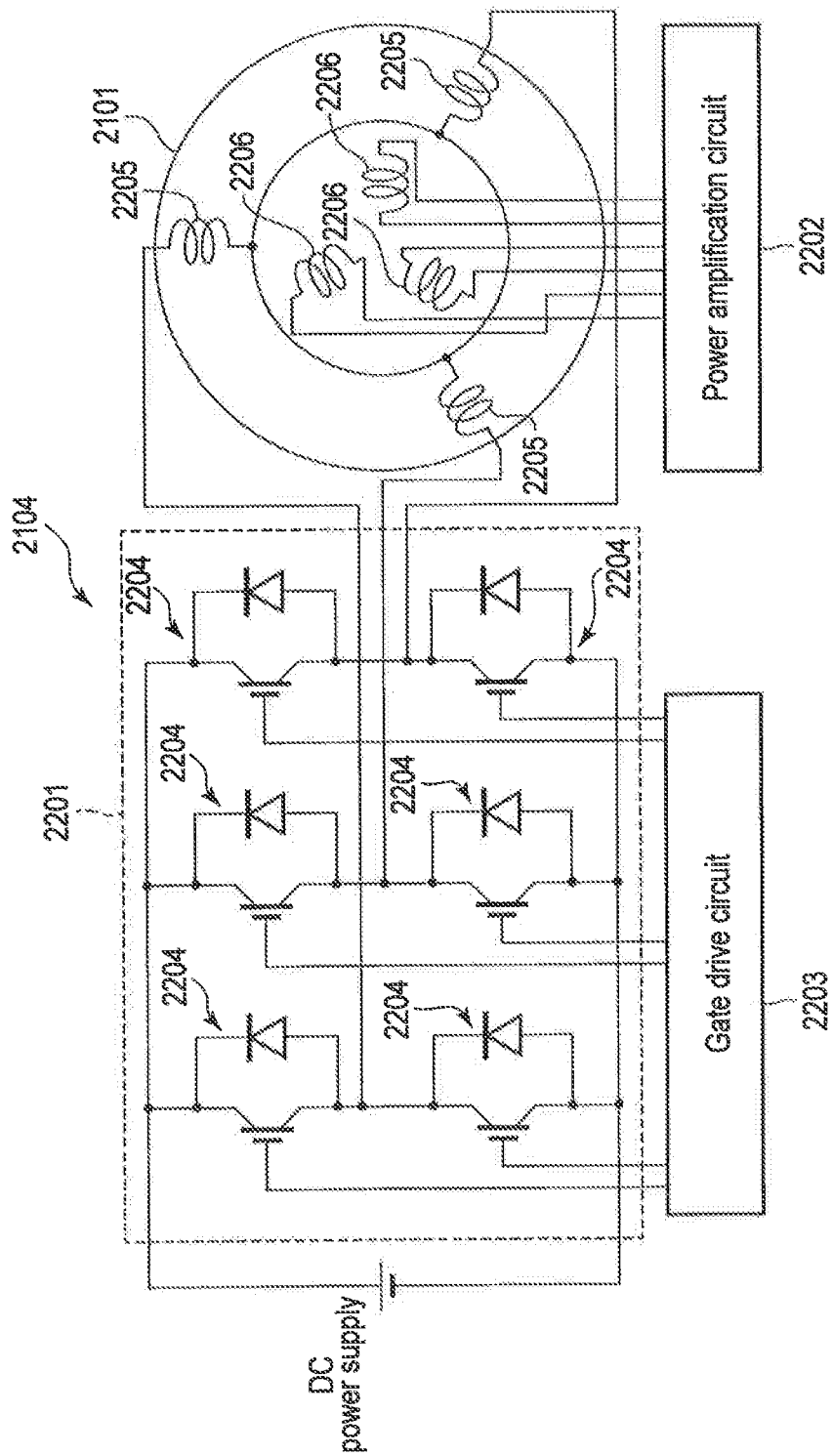
FIG. 22 is a block diagram showing an example of a driving circuit unit shown in FIG. 21.

FIG. 22 schematically shows an example of the driving circuit unit 2104. The driving circuit unit 2104 shown in FIG. 22 includes a switching circuit 2201, a power amplification circuit 2202, and a gate drive circuit 2203. The switching circuit 2201 includes a plurality of switching parts 2204 including, for example, IGBTs (Insulated Gate Bipolar Transistors) and diodes. The switching parts 2204 are bridge-connected to armature coils 2205 providing the respective phases. The switching parts 2204 are driven in accordance with pulse signals from the gate drive circuit 2203. Moreover, field coils 2206 providing the respective phases are supplied with power by the power amplification circuit 2202. In FIG. 22, the rotating electrical machine 2101 is a three-phase rotating electrical machine (that is, a rotating electrical machine including three driving elements each with a rotor and a stator as shown in FIG. 1). The armature coils are configured for a three phase connection.

Even when the rotating electrical machine 2101 uses a different number of phases, the switching circuit 2201 and power amplification circuit 2202 that correspond to the number of phases are applicable. Furthermore, the power amplification circuit 2202 may be applied to the armature coils 2205, and the switching circuit 2201 may be applied to the field coils 2206.

Figure 23:
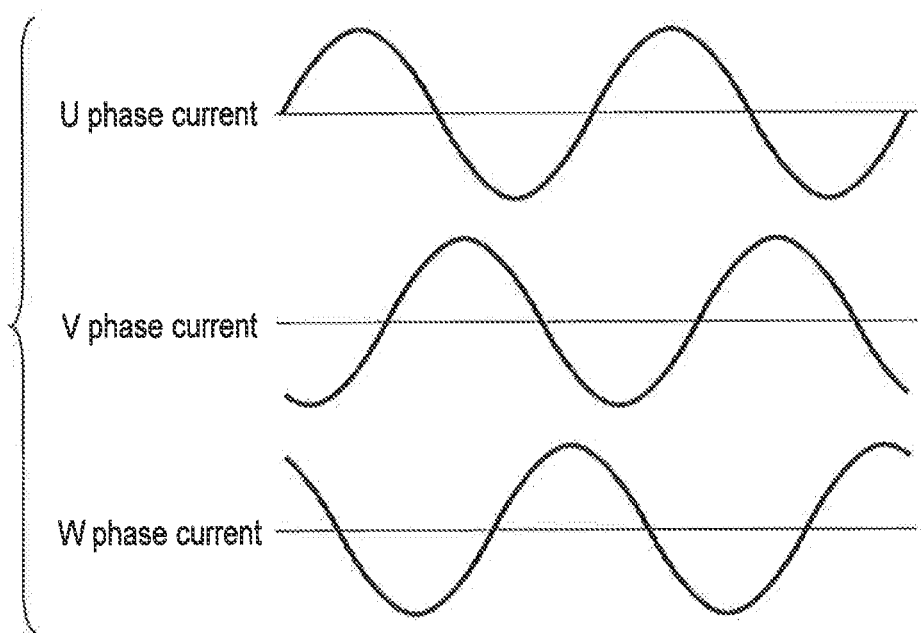
FIG. 23 is a graph showing an example of currents flowing through armature coils shown in FIG. 22.

FIG. 23 shows an example of currents flowing through the armature coils 2205 configured for a three-phase connection. FIG. 23 shows three-phase currents obtained when PWM (Pulse Width Modulation) using the switching circuit 2201 is applied or when output from the power amplification circuit 2202 is applied. In actuality, the three-phase current contains noise. However, FIG. 23 shows components of a fundamental wave having phases 120 degrees apart. The rotor is driven at a speed corresponding to the frequency of the fundamental wave.

Figure 24:
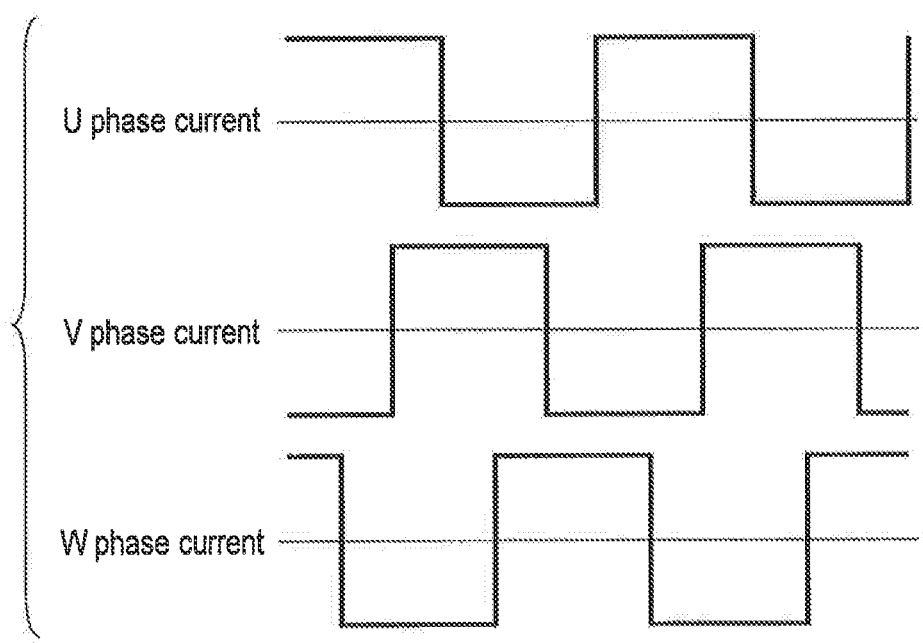
FIG. 24 is a graph showing another example of currents flowing through the armature coils shown in FIG. 22.

FIG. 24 shows an example of currents flowing through the armature coils 2205 configured for a three-phase connection. In FIG. 24, pulse control is performed using the switching circuit 2201, and three-phase currents are supplied which are shaped like rectangular waves and which have phases 120 degrees apart.

The rotating electrical machine 2100 according to the fifth embodiment includes a control system suitable for the position of the rotor and can thus perform stable rotating operations. Moreover, when the angle-of-rotation detection unit 2102 performs sensor-less estimation, the angle-of-rotation sensor 2105 is unnecessary, preventing an increase in costs. Furthermore, the rotating electrical machine 2101 allows the number of phases to be optionally set so that control similar to PWM control for existing synchronous motors or control for existing PM (Permanent Magnet) or hybrid stepping motors can be applied to driving depending on the number of phases.

Sixth Embodiment

In a sixth embodiment, a vehicle with a rotating electrical machine will be described. The rotating electrical machine may be the rotating electrical machine described in any of the first to fourth embodiments. Examples of the vehicle according to the sixth embodiment include a two-, three-, or four-wheeled hybrid car, a two-, three-, or four-wheeled electric car, and a power assisted bicycle.

Hybrid vehicles use a combination of an internal combustion engine and a battery-driven rotating electrical machine as a source of driving force. Electric cars use a battery-driven rotating electrical machine as a source of driving force. A power source with wide rotational-speed and torque ranges is needed for the driving force for vehicles, depending on driving conditions. In general, for internal combustion engines, the torque and rotational speed corresponding to the ideal energy efficiency are limited, and thus, the energy efficiency is lower under driving conditions with different torques and rotational speeds. Hybrid vehicles realize higher energy efficiency as a whole by operating an internal combustion engine under the optimum conditions to generate power and driving the wheels using an efficient rotating electrical machine or driving the wheels using a combination of the power of the internal combustion engine and the power of the rotating electrical machine. Hybrid vehicles regenerate the kinetic energy of the vehicle into power during deceleration to enable a drastic increase in driving distance per unit fuel compared to normal vehicles operating only with the internal combustion engine.

Hybrid cars can be roughly classified into three types according to the combination of the internal combustion engine and the rotating electrical machine.

Figure 25:
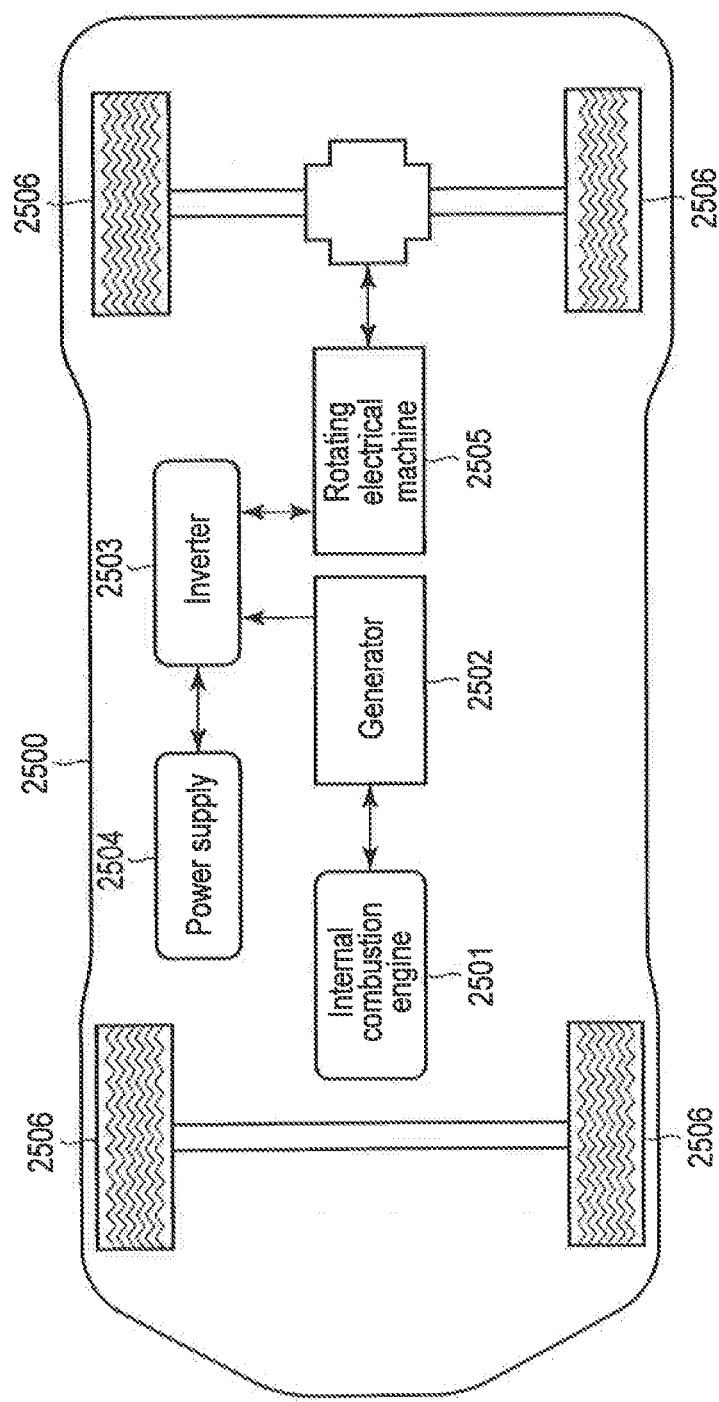
FIG. 25 is a block diagram schematically showing an example of a vehicle according to a sixth embodiment.

FIG. 25 schematically shows a hybrid car 2500 commonly referred to as a series hybrid car. As shown in FIG. 25, the hybrid car 2500 includes an internal combustion engine 2501, a generator 2502, an inverter 2503, a power supply 2504, and a rotating electrical machine 2505, and wheels 2506. The rotating electrical machine 2505 is, for example, the rotating electrical machine 100 according to the first embodiment (FIG. 1) and functions as a motor.

The hybrid car 2500 temporarily converts all power generated by the internal combustion engine 2501 into power. The power is stored in the power supply 2504 through the inverter 2503. The power stored in the power supply 2504 is supplied to the rotating electrical machine 2505 through the inverter 2503. The rotating electrical machine 2505 then rotationally drives the wheels 2506. As described above, the series hybrid car is a system including an electric car combined with a generator. The internal combustion engine can be operated under efficient conditions and can regenerate power. On the other hand, since the wheels are driven by the rotating electrical machine 2505, the rotating electrical machine 2505 needs to provide high power.

Figure 26:
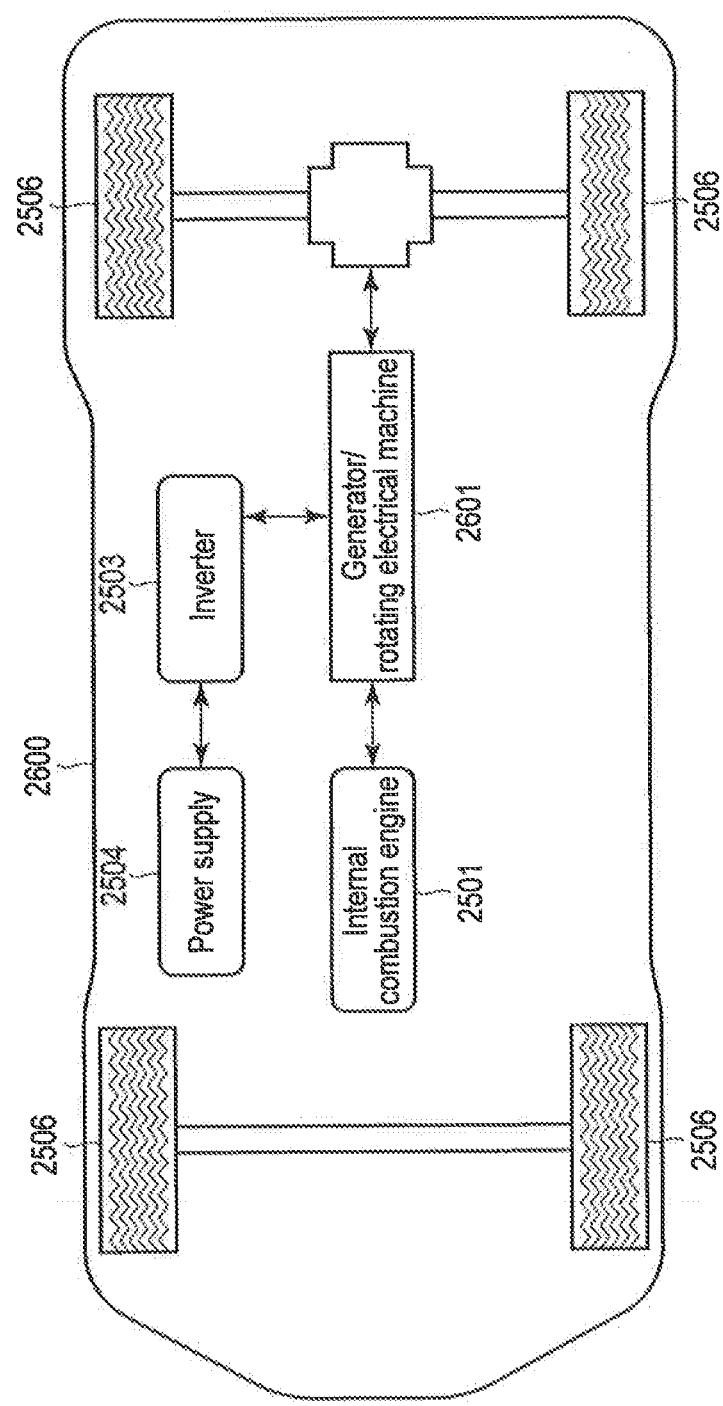
FIG. 26 is a block diagram schematically showing another example of the vehicle according to the sixth embodiment.

FIG. 26 shows a hybrid car 2600 referred to as a parallel hybrid car. As shown in FIG. 26, the hybrid car 2600 includes the internal combustion engine 2501, the inverter 2503, the power supply 2504, a rotating electrical machine 2601, and the wheels 2506. The rotating electrical machine 2601 is, for example, the rotating electrical machine 100 according to the first embodiment (FIG. 1), and is used not only as an electric motor to drive the wheels 2506 but also as a generator.

In the hybrid car 2600, the wheels 2506 are driven chiefly by the internal combustion engine 2501. Power generated by the internal combustion engine 2501 is partly converted into power by the rotating electrical machine 2601 in some cases. The power is stored in the power supply 2504 through the inverter 2503. During starting or acceleration, which involves heavy loads, the rotating electrical machine 2601 is supplied with power by the power supply 2504 through the inverter 2503 and provides driving force for assistance. The hybrid car 2600 is a system based on a normal car and which reduces variations in loads to increase efficiency and which performs power regeneration and the like. The wheels 2506 are driven chiefly by the internal combustion engine 2501. Thus, the output from the rotating electrical machine 2601 can be optionally determined in accordance with the degree of assistance required. The system can be constructed using a relatively small rotating electrical machine 2601 and a relatively small power supply 2504.

FIG. 27 shows a hybrid car 2700 referred to as a series parallel hybrid car. The hybrid car 2700 is a system including a combination of a series hybrid car and a parallel hybrid car. A power splitting mechanism 2701 splits the output from the internal combustion engine 2501 into power for power generation and power for vehicle driving. The series parallel hybrid car controls loads on the engine more finely than the parallel type, allowing the energy efficiency to be increased.

FIG. 28 schematically shows an electric car 2800 according to a sixth embodiment. The rotating electrical machine 2601 is, for example, the rotating electrical machine 100 according to the first embodiment (FIG. 1), and is used not only as a motor to drive the wheels 2506 but also as a generator.

In the electric car 2800, power stored in the power supply 2504 is supplied to the rotating electrical machine 2505 through the inverter 2503. The rotating electrical machine 2505 then rotationally drives the wheels 2506. The rotating electrical machine 2601 drives the wheels 2506, while functioning as a generator to generate power in some cases. The resultant power charges the power supply 2504.

As described above, the sixth embodiment provides a vehicle using the transverse magnetic flux rotating electrical machine according to any of the above-described embodiments.

In the transverse magnetic flux rotating electrical machine according to at least one of the above-described embodiments, the magnetic poles are provided in the rotor and the stator so as to form a magnetic circuit in all cross sections. This enables a reduction in the leakage of magnetic fluxes, allowing a large area to be secured for the magnetic poles. As a result, a high torque can be generated.

The rotating electrical machines according to the embodiments are not limited to examples of a radial gap motor in which a normal to the intermediate plane between the rotor and the stator corresponds to the radial direction as shown in FIG. 1, FIG. 6, FIG. 11, and FIG. 16. The rotating electrical machines may each be an axial gap motor in which the normal to the peripheral surface of the rotor and the stator corresponds to the axial direction. Moreover, the rotating electrical machines according to the embodiments are not limited to examples in which the rotor is positioned inside the stator as shown in FIG. 1, FIG. 6, FIG. 11, and FIG. 16. The rotating electrical machines may each include an outer rotor positioned outside the stator.

While certain embodiments have been described, these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transverse magnetic flux rotating electrical machine comprising:
    a rotor being rotatable about a rotating shaft; and
    a stator provided opposite the rotor, the stator comprises a coil wound in a direction of rotation and a ferromagnetic substance provided around the coil,
    wherein the rotor comprises an annular magnetic field generation part which generates a magnetic field, a plurality of first magnetic poles extending from an end of the magnetic field generation part toward the stator, and a plurality of second magnetic poles extending from another end of the magnetic field generation part, one of a first magnetic pole and a second magnetic pole opposite to the first magnetic pole has a leading end facing a central portion of an opposite surface of the stator which faces an opposite surface of the rotor, and the other of the first magnetic pole and the second magnetic pole has a leading end facing the stator, and
    wherein the ferromagnetic substance comprises an annular portion, a plurality of third magnetic poles extending from an end of the annular portion toward the rotor, and a plurality of fourth magnetic poles extending from another end of the annular portion toward the rotor, one of a third magnetic pole and a fourth magnetic pole opposite to the third magnetic pole has a leading end facing a central portion of the opposite surface of the rotor, and the other of the third magnetic pole and the fourth magnetic pole has a leading end facing the rotor.

2. The machine according to claim 1, further comprising:
    a detection unit configured to detect an angle of rotation of the rotor around the rotating shaft to generate a detection signal;
    a driving circuit unit configured to supply a current to the coil; and
    a rotation controller configured to control the driving circuit unit based on the detection signal.

* * * * *